United States Patent [19]

Bidiville et al.

[11] Patent Number: 5,703,356
[45] Date of Patent: Dec. 30, 1997

[54] POINTING DEVICE UTILIZING A PHOTODETECTOR ARRAY

[75] Inventors: Marc Bidiville, Pully, Switzerland; Eric Raeber, Menlo Park, Calif.; Javier Arreguit, Lausanne, Switzerland; Harthmuth Buczek, Marin-Epagnier, Switzerland; Floris A. Van Shaik, Chavannes, Switzerland; François Bauduin, Chézard, Switzerland; Denis O'Keeffe, Eire, Ireland

[73] Assignee: Logitech, Inc., Fremont, Calif.

[21] Appl. No.: 424,125

[22] Filed: Apr. 19, 1995

Related U.S. Application Data

[63] Continuation-in-part of Ser. No. 199,982, Feb. 18, 1994, abandoned, which is a continuation of Ser. No. 956,907, Oct. 5, 1992, Pat. No. 5,288,993.

[51] Int. Cl.$^6$ .................................................. G09G 5/08
[52] U.S. Cl. .......................... 250/221; 345/165; 345/167; 250/231.13
[58] Field of Search ................... 250/231.13, 231.12, 250/231.18, 229, 221, 237 G, 227.13; 356/375; 340/710; 345/163, 164, 165, 166, 167, 156, 157, 158, 179; 341/13, 14, 5, 6, 31

[56] References Cited

U.S. PATENT DOCUMENTS

| | | |
|---|---|---|
| 4,546,347 | 10/1985 | Kirsch ................................. 340/710 |
| 4,698,626 | 10/1987 | Sato et al. ........................... 340/710 |
| 4,720,631 | 1/1988 | Lapeyre ............................... 250/237 G |
| 4,751,380 | 6/1988 | Victor et al. ........................ 250/221 |
| 4,794,384 | 12/1988 | Jackson ............................... 345/166 |
| 4,799,055 | 1/1989 | Nestler et al. ....................... 345/166 |
| 4,920,260 | 4/1990 | Victor et al. ........................ 250/221 |
| 5,015,070 | 5/1991 | Montgomery et al. ................ 350/163 |
| 5,027,115 | 6/1991 | Sato et al. ........................... 341/13 |
| 5,288,993 | 2/1994 | Bidiville et al. ..................... 250/221 |
| 5,298,919 | 3/1994 | Chang ................................. 345/163 |

OTHER PUBLICATIONS

"Optical Pen Mouse", *Xerox Discolsure Journal*, vol. 10, No. 3, May/Jun. 1985.

*Primary Examiner*—Edward P. Westin
*Assistant Examiner*—John R. Lee
*Attorney, Agent, or Firm*—Fenwick & West LLP

[57] ABSTRACT

A cursor control device for personal computers and workstations includes various embodiments, some of which include a patterned ball and some of which rely on other patterned surfaces, which recognizes changes in the position of the pattern relative to a sensor having an array of photosensitive elements. Circuitry associated with the sensor determines movement of the pattern across the array, and translates that movement into conventional cursor control signals supplied to a host system.

34 Claims, 26 Drawing Sheets

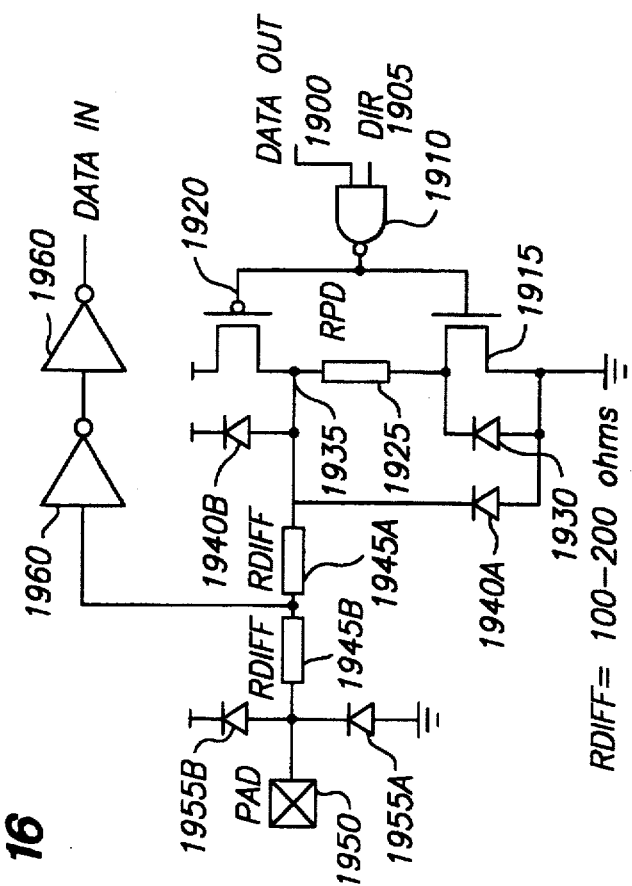
FIG. 16
FIG. 18
RDIFF = 100-200 ohms
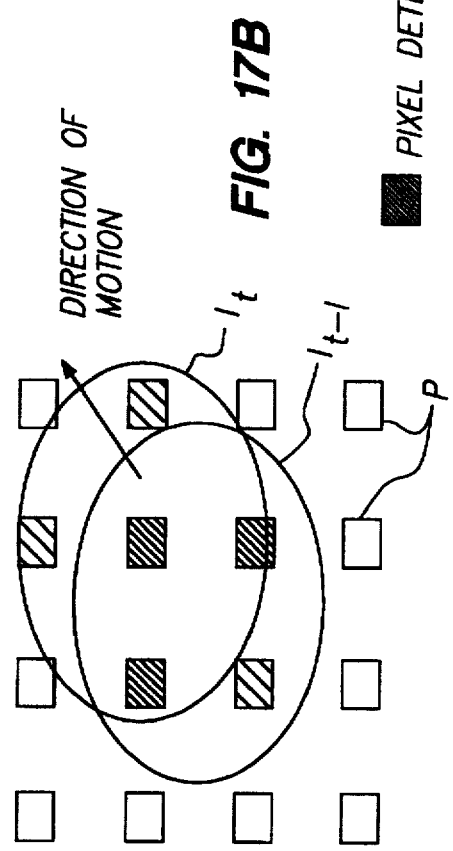
FIG. 17B
■ PIXEL DETECTING AN INTENSITY CHANGE

POINTING DEVICE UTILIZING A PHOTODETECTOR ARRAY

RELATED APPLICATION

This application is a continuation-in-part of U.S. patent application Ser. No. 08/199,982, filed Feb. 18, 1994, now abandoned, which is a continuation of U.S. patent application Ser. No. 956,907, filed Oct. 5, 1992, and now U.S. Pat. No. 5,288,993.

FIELD OF THE INVENTION

The present invention relates to pointing devices for cursors on displays for personal computers, workstations and other computing devices having cursor control devices, and more particularly relates to optical devices and methods for translating rotation of a patterned ball over optical elements or movement of an optical device over a patterned surface into digital signals representative of such movement.

BACKGROUND OF THE INVENTION

Pointing devices, such as mice and trackballs, are well known peripherals for personal computers and workstations. Such pointing devices allow rapid relocation of the cursor on a display screen, and are useful in many text, database and graphical programs. Perhaps the most common form of pointing device is the electronic mouse; the second most common may well be the trackball.

With a mouse, the user controls the cursor by moving the mouse over a reference surface; the cursor moves a direction and distance proportional to the movement of the mouse. Although some electronic mice use reflectance of light over a reference pad, and others use a mechanical approach, most prior art mice use a ball which is on the underside of the mouse and rolls over the reference surface (such as a desktop) when the mouse is moved. In such a prior art device, the ball contacts a pair of shaft encoders and the rotation of the ball rotates the shaft encoders, which historically includes an encoding wheel having a plurality of slits therein. A light source, often an LED, is positioned on one side of the encoding wheel, while a photosensor, such as a phototransistor, is positioned substantially opposite the light source. Rotation of the encoding wheel therebetween causes a series of light pulses to be received by the photosensor, by which the rotational movement of the ball can be converted to a digital representation useable to move the cursor.

The optomechanical operation of a trackball is similar, although many structural differences exist. In a trackball, the device remains stationary while the user rotates the ball with the thumb, fingers or palm of the hand; one ergonomic trackball is shown in U.S. Pat. No. 5,122,654, assigned to the assignee of the present invention. As with the mouse, the ball in a conventional trackball typically engages a pair of shaft encoders having encoding wheels thereon. Associated with the encoding wheels are light sources and photosensors, which generate pulses when the movement of the ball causes rotation of the shaft encoders. One prior art trackball using this approach is shown in U.S. Pat. No. 5,008,528.

Although such a prior art approach has worked well for some time, with high quality mice and trackballs providing years of trouble-free use, the mechanical elements of such pointing devices necessarily limit the useful life of the device.

Optical mice which illuminate a reference pad, while having few or no mechanical parts, have historically been limited due to the need for the reference pad to have a regular pattern, as well as many other limitations.

Additionally, in conventional electronic mice, a quadrature signal representative of the movement of the mouse is generated by the use of two pairs of LED's and photodetectors. However, the quality of the quadrature signal has often varied with the matching of the sensitivity of the photosensor to the light output of the LED. In many instances, this has required the expensive process of matching LED's and photodetectors prior to assembly. In addition, varying light outputs from the LED can create poor focus of light onto the sensor, and extreme sensitivity of photosensor output to the distance between the LED, the encoding wheel, and the photosensor.

There has therefore been a need for a photosensor which does not require matching to a particular LED or batch of LED's, while at the same time providing good response over varying LED-to-sensor distances.

In addition, many prior art mice involve the use of a mask in combination with an encoder wheel to properly distinguish rotation of the encoder wheel. Because such masks and encoder wheels are typically constructed of injection molded plastic, tolerances cannot be controlled to the precision of most semiconductor devices. This has led, effectively, to a mechanical upper limit imposed on the accuracy of the conventional optomechanical mouse, despite the fact that the forward path of software using such mice calls for the availability of ever-increasing resolution. There has therefore been a need for a cursor control device for which accuracy is not limited by the historical tolerances of injection molding.

SUMMARY OF THE INVENTION

The present invention substantially overcomes the foregoing limitations of the prior art by providing an optical sensing system which eliminates entirely the use of shaft encoders, the encoding wheels associated with shaft encoders, masks or other mechanical elements normally associated with optomechanical pointing devices. The present invention can be implemented with either a mouse or a trackball, although the exemplary embodiments described hereinafter will discuss primarily trackball implementations. In addition, while most embodiments require a patterned ball, some embodiments of the present invention do not require any ball at all.

For those embodiments which use a ball, the present invention employs a ball having a pattern of spots (which are typically but not necessarily irregular in location and may be randomly sized within a suitable range) in a color which contrasts with the background color, such as black spots on an otherwise white ball. One or more light sources, typically LED's, illuminate a portion of the ball and a portion of that light illuminates a sensor array comprising a plurality of individual sensor elements to create an image of a portion of the ball. An optical element such as a lens or diffractive optical element may be provided to focus the image of the ball on the array. The signals generated by the array are then acted upon by logic and analog circuits, for example employing a biologically inspired VLSI circuit, such that the movement of the ball is converted into X and Y components for movement of the cursor on the video display. Except for the mechanical aspects of the ball itself (and in some instances the bearings on which the ball is supported), the electronic trackball of the present invention is entirely optical; when the ball is included, the trackball of the present invention may reasonably be thought of as an optomechanical pointing device although it has no mechanical moving parts other than the ball. It will be apparent that the techniques used herein may readily be adapted to other types of pointing devices, particularly electronic mice.

As noted above, it is also possible to implement the optical aspects of the present invention into an electronic mouse or similar device which does not use a ball. In one example of such embodiments, the pointing device is typically resting on a patterned surface, which may for example be a substantially low reflectance surface having thereon a substantially random pattern of a different reflectance, as opposed to the arrangement of a high reflectance/very low reflectance, rigidly uniform pattern to which the prior art was limited. In these embodiments, the optical elements of the present invention are modified slightly to illuminate a portion of the patterned surface. The light reflected from the patterned surface to the sensor creates an image of the patterned surface on the sensor, which permits detection of movement in the manner discussed above. The size of the pattern elements may be varied in accordance with the capability of the optics to resolve the pattern, and with appropriate optics may use pattern elements similar in size to those on a ball according to the present invention, or in some cases no larger than the pattern normally occurring in, for example, blank paper. In one particular embodiment, the pattern of the fingerprint on a human finger (i.e., the ridges of the various whorls) is adequate.

It is therefore one object of the present invention to provide an optomechanical pointing device not requiring shaft encoders.

It is another object of the present invention to provide an electronic pointing device using analog or similar circuits, for example a biologically inspired VLSI circuit, to convert rotation of a ball into cursor control signals.

Another object of the present invention is to provide a pointing device in which light illuminating a surface is directed to a sensor through a mirror and lens combination.

It is yet another object of the present invention to provide an electronic pointing device employing a random pattern of randomly sized and shaped spots on a ball in combination with an optical array to provide signals for generating cursor control signals.

It is a still further object of the present invention to provide an electronic pointing device using a light source in combination with an optical element and a photosensitive array to provide signals for generating cursor control signals.

Yet another object of the present invention is to provide an optical pointing device which does not require a ball.

Still a further object of the present invention is to provide an electronic mouse not requiring any special pattern or tablet.

Yet a further object of the present invention is to provide a pointing device which employs frustrated total internal reflection to detect movement.

Another object of the present invention is to provide an optical pointing device which uses the human fingerprint as a pattern for detecting movement of the pointing device.

These and other objects of the present invention may be better appreciated from the following detailed description of the invention, taken in combination with the accompanying Figures.

THE FIGURES

FIG. 16 illustrates the arrangement of pixels within the pixel matrix of the sensor of FIG. 13.

FIG. 17B depicts two images of the ball on the pixel matrix at times t and t−1.

FIG. 18 shows in schematic diagram form the operation of the bidirectional pad of FIG. 13.

FIG. 20C shows in front elevational view the third embodiment of the invention.

FIG. 20D shows in back elevational view the third embodiment of the invention.

Figure 23A:
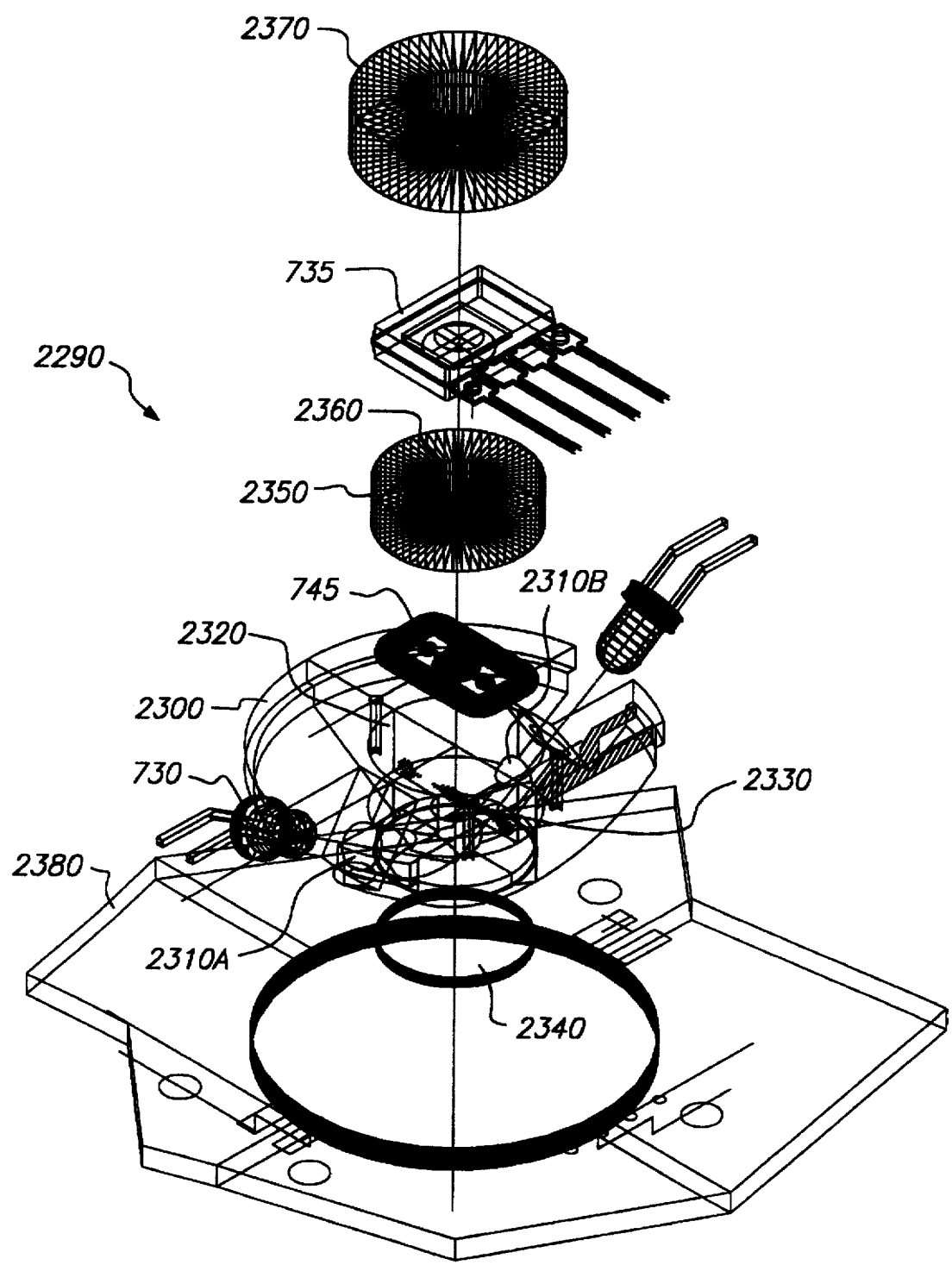
Figure 23B:
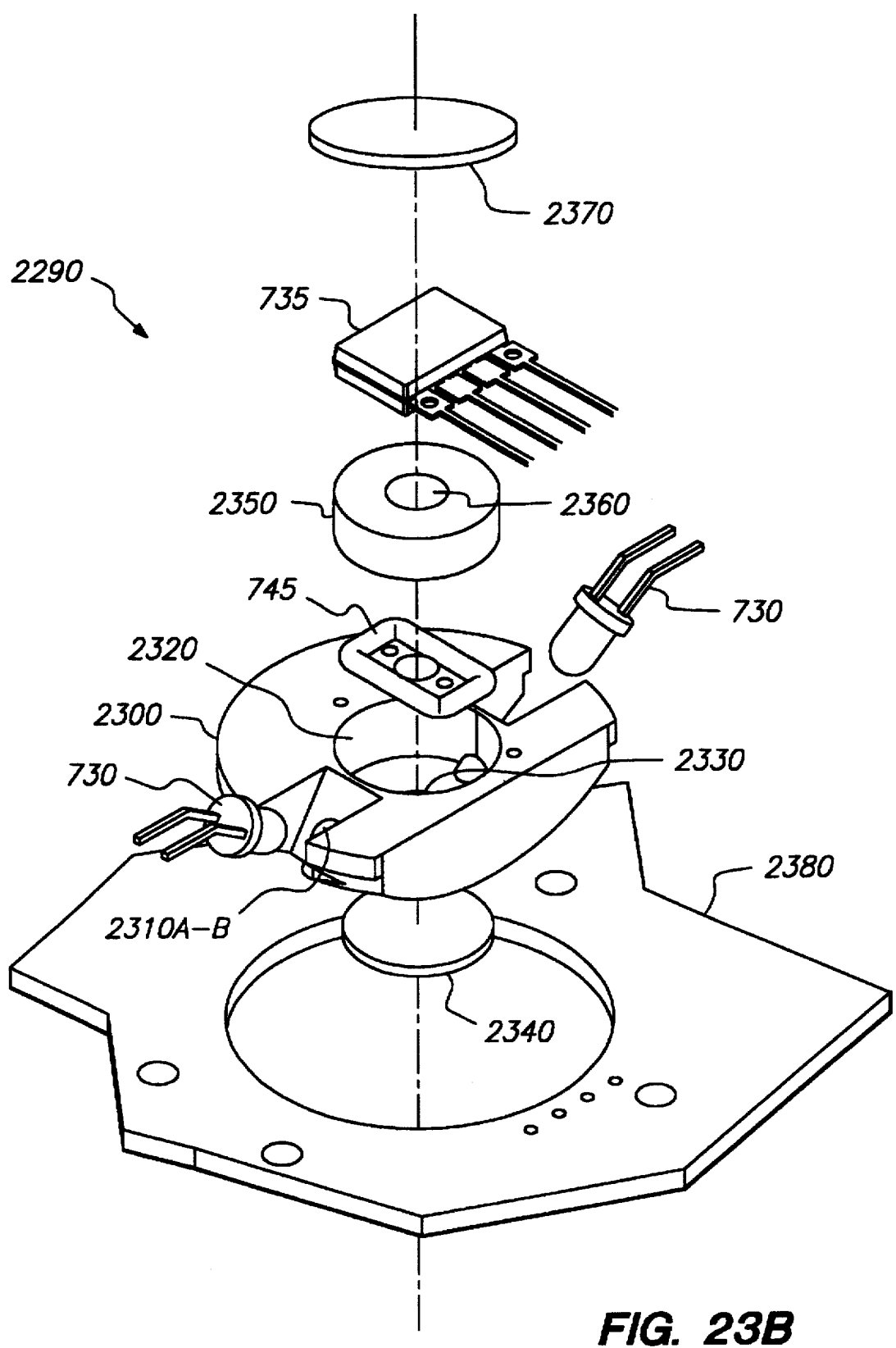

FIGS. 23A–B show in exploded perspective view the optical components of a fifth embodiment of the invention. FIG. 23A is a wire frame view, with no hidden lines, to show additional structural features, while FIG. 23B is a more conventional perspective view.

DETAILED DESCRIPTION OF THE INVENTION

Figure 1:
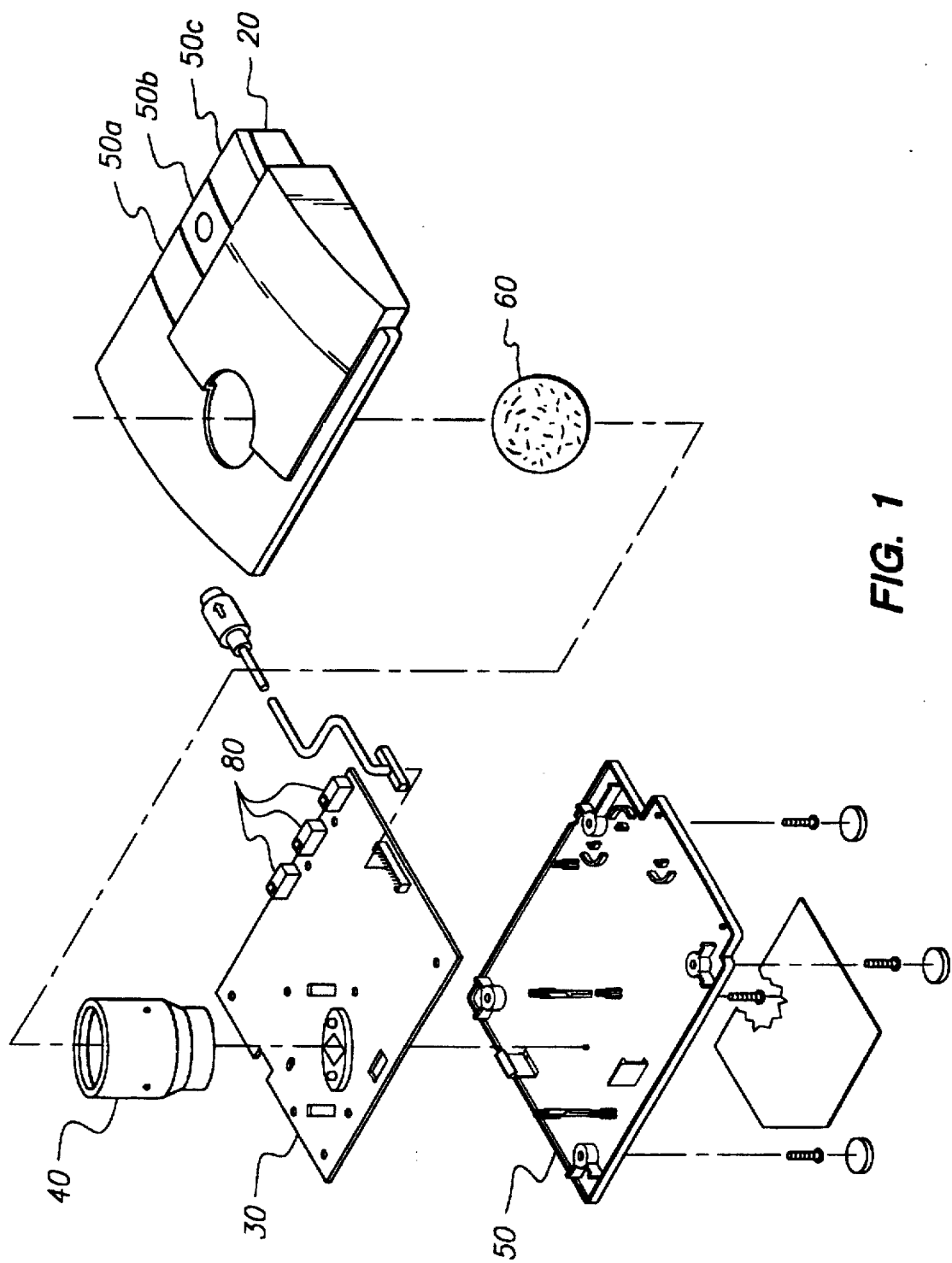
FIG. 1 shows in exploded view an electronic trackball according to the present invention.

Referring first to FIG. 1, an electronic pointing device, and in particular an electronic trackball 10, is shown in exploded perspective view. The trackball 10 includes an upper housing 20, a printed circuit board 30 close to which a ball cage 40 is juxtaposed, a lower housing 50, a ball 60, and a plurality of buttons 70 located on the upper housing 20 which actuate associated switches 80. The switches 80 are normally located on the circuit board 30. The ball cage 40 typically is mounted on the PCB 30, although in some instances it can be mounted on a housing member.

Figure 3:
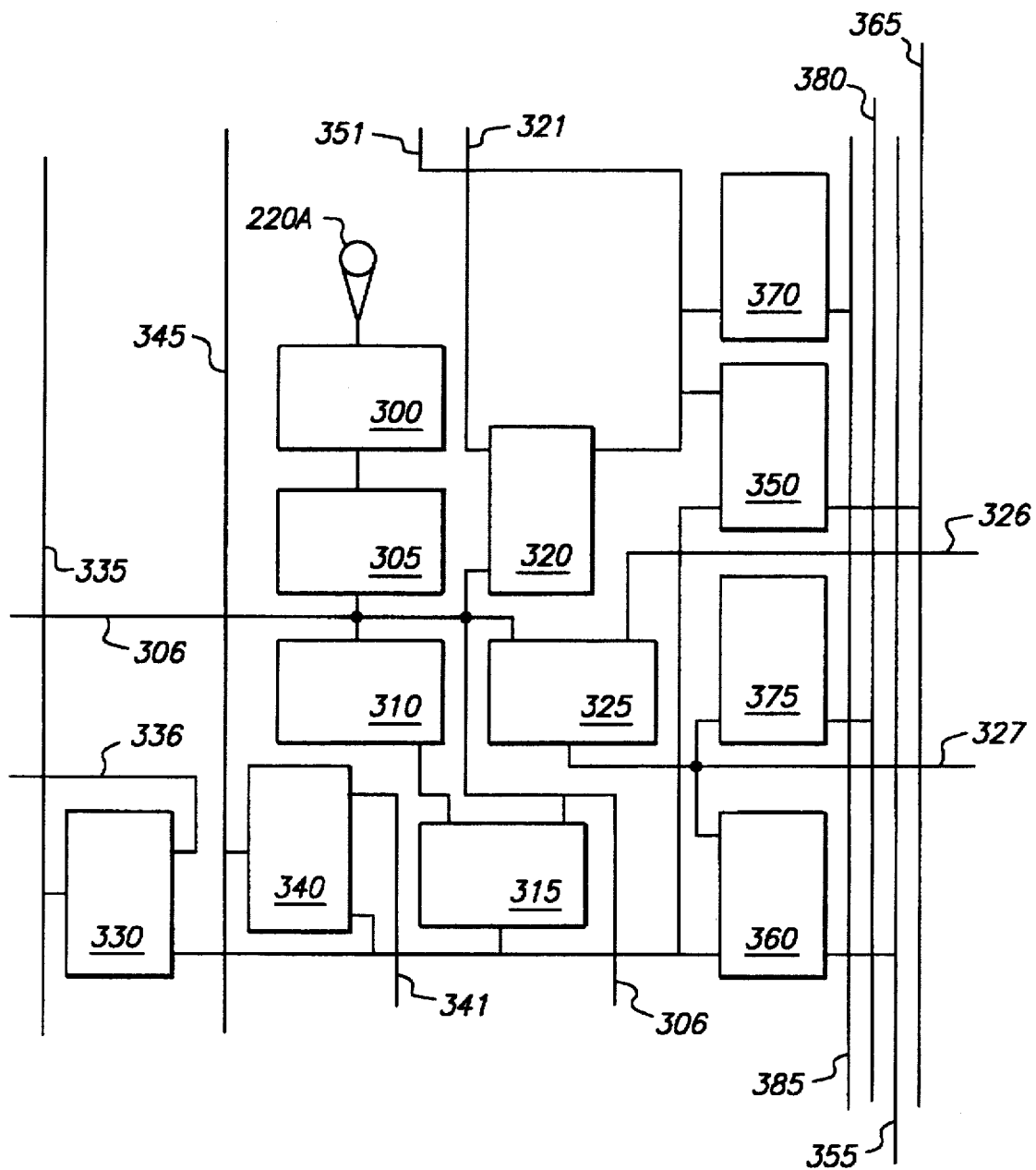
FIG. 3 shows in schematic block diagram form the circuitry of a single pixel according to the present invention.
Figure 4:
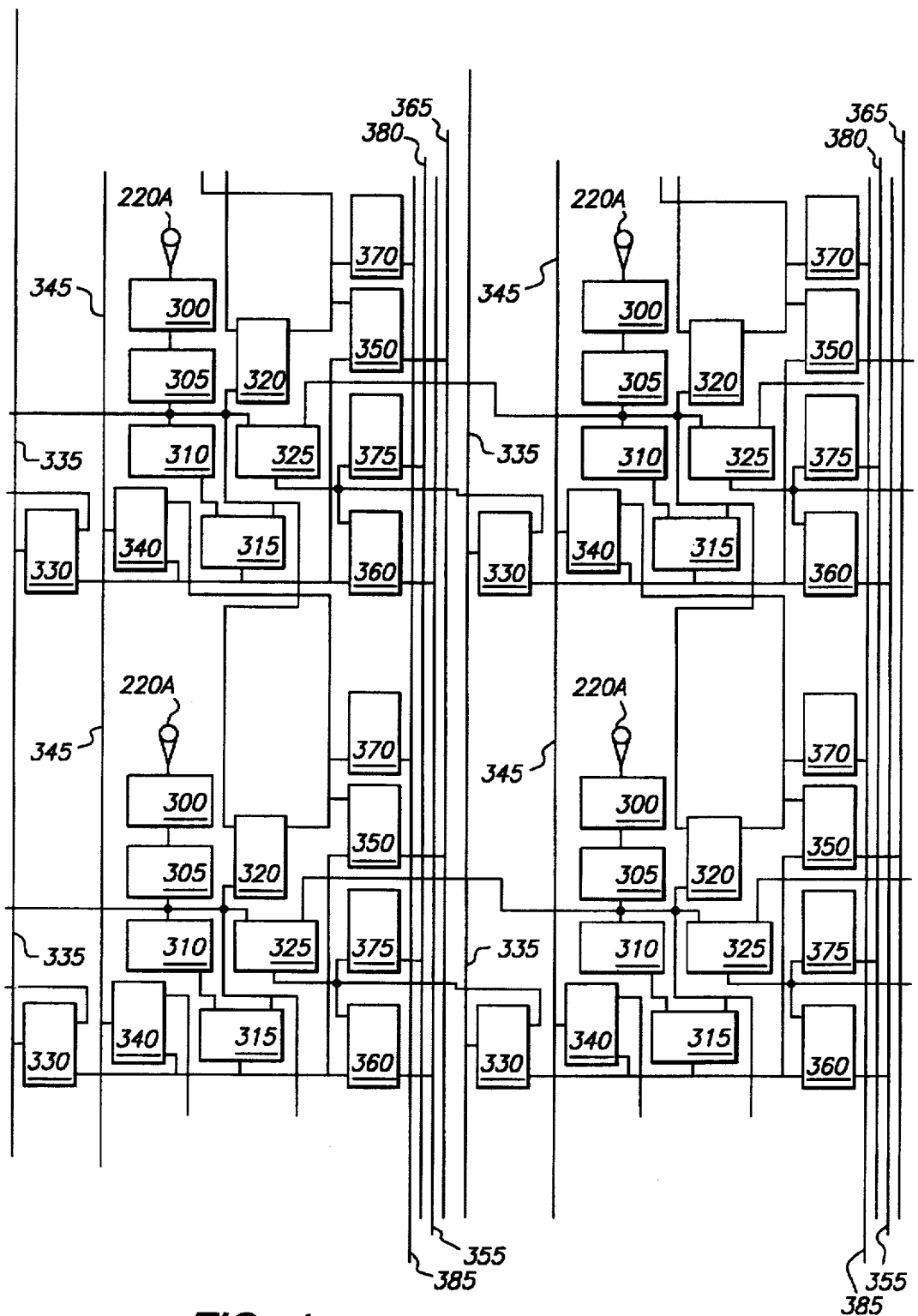
FIG. 4 shows an array of four of the block diagrams of FIG. 3, thus showing the interrelationship between the pixels.

The printed circuit board 30 includes circuitry for operating on the signals provided by a sensor and associated logic (see FIGS. 3 and 4). Thus, movement of the ball in the trackball is in turn converted into digital signals which control the cursor on the screen of an associated personal computer, terminal or workstation. In serial port pointing devices, the printed circuit board will typically include a microprocessor and related driver circuitry for sending and receiving standard serial communications, such as RS232 signals. Alternatively, the signals provided by the mouse will be compatible with PS/2 ports.

Figure 2A:
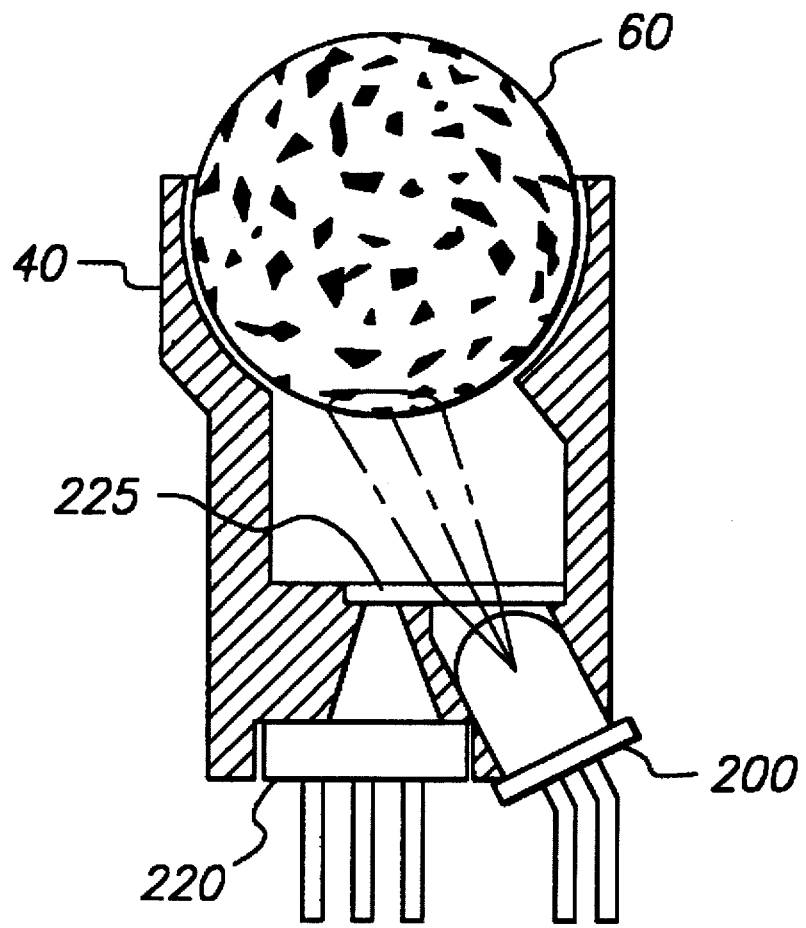
FIG. 2A shows a generalized cross-sectional side view of the ball cage and ball of the present invention.

Referring next to FIG. 2A, a ball cage 40 (shown in cross-section) and a ball 60 according to the present invention are shown. As will be immediately appreciated by those skilled in the art, the combination of ball 60 and ball cage 40 are markedly different from the prior art and form a key aspect of the present invention. In particular, the ball 60 can be seen to have a plurality of randomly shaped markings thereon in a color which contrasts with the background, such that the overall effect is a randomly speckled ball. A typical ball may, for example, have black spots on an otherwise white ball, although many other color combinations would be acceptable. In some embodiments, the ball may be illuminated by infrared or other non-visible light, in which case the speckles may be implemented in a manner which is visible to the associated light source but opaque to visible light. One example of such an arrangement is a coating on the ball which is opaque, for example black, in the visible spectrum, but transparent to infrared light, with appropriate speckles beneath the coating.

The randomly shaped markings or spots are randomly or irregularly arranged on the ball, although the markings are within a predetermined suitable range. Thus, the markings for this embodiment typically will range in size from 0.5 $mm^2$ to 0.7 $mm^2$, with a density of about one spot per square millimeter. In an exemplary embodiment, the ball may be on the order of 10 mm in diameter, although the diameter could range from 5 mm or smaller to larger than 50 mm. In addition, and as can be better appreciated from FIG. 2B which shows a more detailed cross-sectional view of the ball and ball cage taken along the centerlines thereof, the ball cage 40 includes at least one (FIG. 2A), and in some cases two or more (FIG. 2B), light sources 200 such as an LED, which produces light that impinges on the ball 60. The LED or other light source may include an integrally formed lens. The light from the light sources 200 is preferably reflected off the inside surface 205 of the outer wall 210 of the ball cage 40, and is partially blocked by an interior wall 215 from striking directly the ball 60. The inside surface 205 may be, for example, the inside surface of a sphere. In this manner the light from the light sources 200 is distributed relatively uniformly across a predetermined portion of the ball, while at the same time the light is caused to strike the ball obliquely, providing illumination of the ball and allowing light to light diffusely a sensor.

Figure 2B:
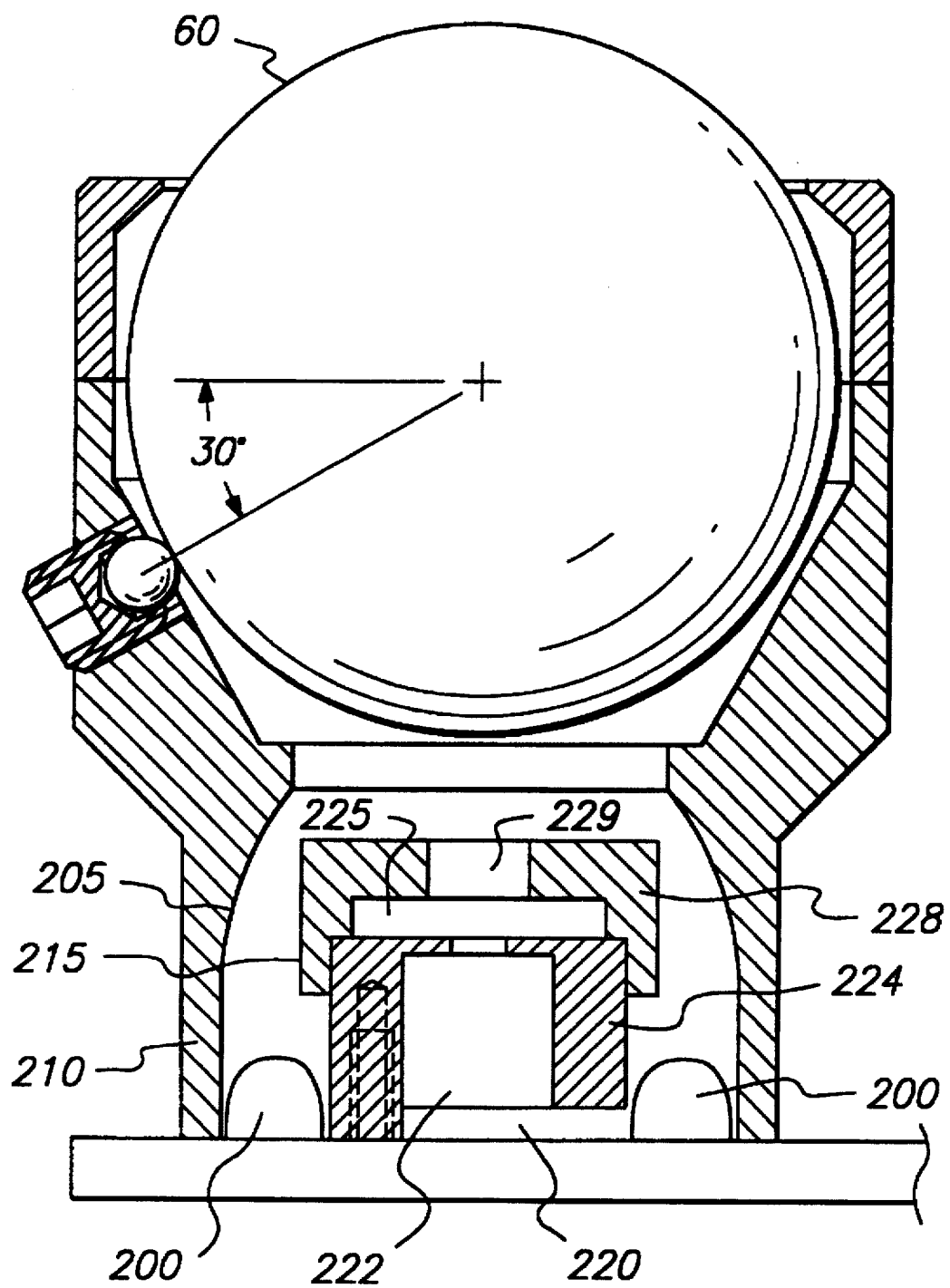
FIG. 2B shows a more detailed cross-sectional side view of the ball cage and ball of the present invention, including light paths.

The ball is maintained in a rotatable position by a plurality of supports 150, which may for example be rollers of a conventional type, or may be jeweled bearing surfaces of the type disclosed in U.S. patent application Ser. No. 07/820, 500, entitled Bearing Support for a Trackball, filed Jan. 14, 1992, now abandoned, and assigned to the same assignee as the present invention, incorporated herein by reference. Although only one such roller is shown in FIG. 2B because of the view shown, a plurality, typically three, such rollers are provided to ensure uniform support for the ball 60. A removable cover may be provided in some embodiments to permit readily insertion and removal of the ball 60; while such a removable cover is at present believed preferable, to permit cleaning of the ball and the inside of the pointing device, in at least some embodiments such a removable cover is unnecessary.

A photodetector array 220 is located centrally between the light sources 200 in a chamber 222 formed within a housing 224. A portion of the light which strikes the ball 60 is diffusely reflected into the array 220 through an optical element 225. The result is that an image of at least a portion of the illuminated surface of the ball is formed on the array 220. In an important distinction from prior art optomechanical mice, the ball cage includes no shaft encoders, nor does it include the matched light source and photodetector typical of prior optomechanical mice. The optical element 225 is typically fixed in location between the housing 224 and an aperture housing 228 of which the interior wall 215 forms the outside surface. An aperture 229 is provided in the aperture housing 228 to permit the diffuse light reflected off the ball 60 to reach the optical element 225, and then the photosensitive array 220.

Figure 5A:
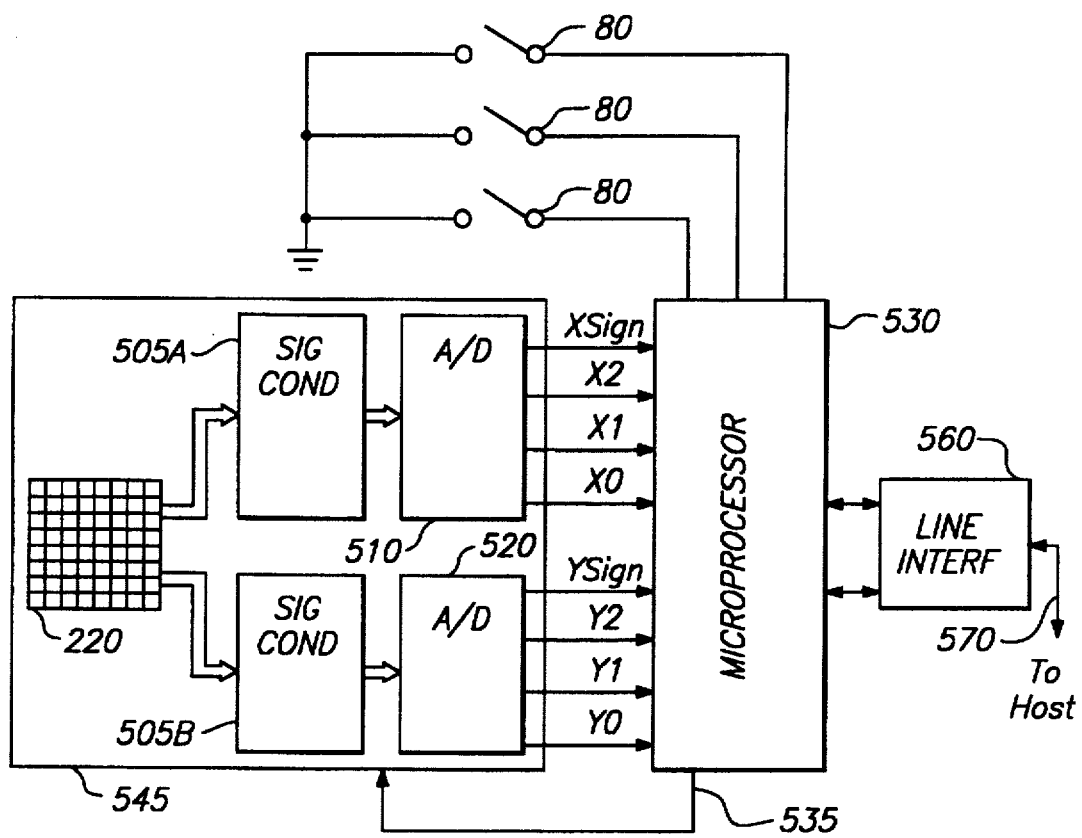
FIG. 5A shows in schematic block diagram form the circuitry used for cursor control in the present invention.

The photodetector array 220 will typically range in overall size from 1×1 mm to 7×7 mm, with each detector segment, or pixel, 220A-220n having dimensions in the range of 20×20 µm to 300×300 µm or more, where the exact dimensions are determined by the size of the overall array and the size of the individual detector. In the exemplary embodiments discussed herein, each pixel is on the order of 300×300 µm. As will be discussed hereinafter in connection with FIGS. 3 and 4, in the preferred embodiments of the invention described herein, each pixel includes a photodetector element and associated circuitry for conditioning the output of the photodetector element into a signal useable external to the array. The diameter of the ball (or other pattern) area whose image is projected on the sensor and used for detection corresponds to the detector field diameter, and thus determines the maximum field angle to be covered by the optics. In an exemplary embodiment, a typical ball area diameter viewable for detection may be on the order of 2.8 mm, which represents a field of 6.2 mm$^2$, and the array 220 may comprise a matrix of 8×8 detectors 220A-n, although other embodiments described hereinafter may use a matrix of 11×11 detectors. Although a square array of detectors has been implemented (substantially as shown in FIG. 5A), in at least some embodiments it may be preferable to arrange the individual detectors in a circle or hexagon. Depending upon the application, the detectors may be arranged across the area of the element, or may be positioned around the circumference, such as the circumference of a circle, where the contrast and resolution are more constant and thus give the best performance at the lowest cost. In one preferred embodiment, a square matrix is used but the corner elements are unused, to approximate a circle. In general, the objective is to match the area of the sensor with active pixels to the field of view obtained through the optics. In the exemplary embodiments discussed herein, this detector field typically approximates a circle, and in a typical embodiment will have a detector field diameter on the order of 3.25 mm.

At present, it appears that the size of an acceptable spot on the ball is relatively independent of the diameter of the ball. However, it has been found that the minimum size of a spot on the ball should be large enough that, when the image of the ball is focused on the sensor, the image of one spot covers at least one photodetector at all times and in all directions. It is preferred that, as a minimum, the size of the image of a single dot or speckle on the sensor should cover the center to center distance between two adjacent pixels on the sensor. In general, however, the preferred typical dot size has been selected so that the surface covered by the image of the dot covers about five pixels. As a maximum, the image may cover substantially all of the sensor, although such an image size will cause degraded performance, as discussed below. Dot density may vary between 0.8 percent and 99.2 percent, but it is generally preferred that dot density be between twenty and seventy percent, with a typically preferred density on the order of forty percent. In a substantially case, with case, with a projected image size covering 8.3 mm$^2$ on the sensor, the total or sum of the black or low intensity areas comprises 3.2 mm$^2$, while the total or sum of the white or higher intensity areas comprises 5.1 mm$^2$. A contrast ratio of at least 2.5 between low intensity and high intensity areas of the image on the sensor is generally preferred.

Use of a dot size within the appropriate range permits motion detection of an image, (for example grayscale, binary or other format) to be based on tracking of the differences in spatial intensity (or, more simply, "edges") of the spots. The maximum dimension of the spot is related to the minimum desired output precision of the system; as will be better appreciated hereinafter, the resolution of the system depends upon the number of edges that move divided by the total number of edges viewable. In an exemplary embodiment described hereinafter, for an output resolution greater than 15 dots/mm, it is useful to have an image with at least sixteen edges in each of the X and Y directions. If the number of edges is too small, movement of the cursor will appear "jumpy" in response to movement of the ball. For a four bit A/D converter plus sign, sixteen edges are used to reach unit increments.

In addition, it is important to maximize the amount of diffuse light energy reflected off the ball 60 and reaching the detector array 220, and in particular each particular detector element 220A-n. Although a wide range of magnifications is workable, a magnification of −1 is preferable to minimize the effects of mechanical tolerances. In addition, because of the small size, expense, and required modulation transfer, conventional lenses are unsatisfactory in at least some of the presently preferred embodiments. Instead, for those embodiments where conventional lenses are unsatisfactory, diffractive optical elements (DOE's) are preferable. However, in some embodiments, as described hereinafter, classical lenses may be used although some reduction in resolution may be necessary. Even for embodiments which use classical lenses, a resolution on the order of one line per millimeter is possible.

In particular, in at least some embodiments DOE's can provide the required light transfer while at the same time being fabricated by means of relatively conventional lithographic and etching methods known from microelectronics fabrication which fit into the normal manufacturing processes for fabricating the detector array itself, thus keeping additional costs to a minimum.

Additionally, while both spherical and aspherical lenses may be used in appropriate embodiments, aspherical functionality can be readily provided in a DOE at virtually no additional expense, and provides desirable light transfer capabilities although it does involve a more complicated design effort. In addition, different optical functions may be included in the same DOE, so that a portion of the DOE substrate can be fabricated with a first microstructure which directs the illumination cone from a light source at the appropriate incidence angle onto the ball surface, and a second microstructure which acts as an aspheric lens for pattern imaging, so that the image of the ball illuminated by the first microstructure is properly focused on the array 220 by the second microstructure. Although such multiple DOE structures are attractive for at least some embodiments of the present invention, in the generally preferred arrangement a DOE is used only for imaging the illuminated area of the speckled ball 60 onto the array 220.

In such an exemplary embodiment, the focal length of the DOE is on the order of 2.4 mm where the total ball-to-detector array distance is on the order of 10 mm. The aperture diameter is on the order of 1–1.5 mm, or a numerical aperture (NA) on the order of 0.1. In addition, because the magnification is −1, the DOE is located midway between the ball 60 and the detector array 220.

As with other optomechanical mice, the motion to be detected corresponds either to two translations (x,y), or one translation and one rotation about the center of the image. Additionally, for power consumption reasons, the LED's are pulsed in the manner described in U.S. patent application Ser. No. 07/717,187, filed Jun. 18, 1991, now U.S. Pat. No. 5,256,913 and entitled Low Power Optoelectronic Device and Method, meaning that the photodetectors 220A–N can only detect a series of "snapshots" of the ball. Finally, the output of the detector array 220 preferably is compatible with a microprocessor input so that the signal can be readily converted to control of a cursor. For example, the output could conform to the type of output provided by designs employing optical encoders, such as described in U.S. Pat. No. 5,008,528, and would result in a two-bit quadrature code of about 15 impulsions per millimeter of ball displacement.

For the exemplary embodiment of FIGS. 1–2, circuitry for operating on the output signals received from the detector array 220 can be better understood by reference to FIG. 3, although FIG. 3 shows photodetector and logic comprising only a single pixel. Similar logic exists for each pixel 200A-n in the detector array (a four pixel array is shown in FIG. 4A), with the end result being a collective computation for the array as a whole. In an exemplary embodiment, the detector array 220 and the associated logic arrays of the type shown in FIG. 3 are all implemented on a single die, and in particular the individual detector and associated circuit elements formed on the same pixel.

As a general explanation of the operation of the circuits of FIGS. 3 and 4, the basic function of the algorithm is the correlation of edges and temporal intensity changes ("tics"). Referring particularly to FIG. 3, a photodetector 220A such as a reverse biased photodiode generates a current proportional to the intensity of the light reflected off the ball onto the detector 220A. The current is compared with a threshold by a threshold circuit 300, to decide whether the pixel is white or black. The threshold can be adjusted differently for different sensor zones, such as to compensate for uneven lighting; such adjustment can be made automatically or otherwise, depending on application. Alternatively, a differential circuit, based on the signals from neighboring cells, can be used to reduce sensitivity to variations in lighting intensity, ball speckle density, and so on.

While a photodiode has been used in the exemplary embodiment of the photodetector 220A, it is also possible to use a phototransistor in a number of embodiments. Phototransistors offer the advantage of high current gain, and thus give a high current output for a given level of illumination. However, in some embodiments photodiodes continue to be preferred because at least some phototransistors have degraded current gain and device matching characteristics at low illumination, while photodiodes at present offer slightly more predictable performance, and thus greater precision.

The output of the threshold circuit 300 is then supplied to a first memory 305, which stores the state of the threshold circuit and allows the LED to be switched off without losing the illumination value of the image. The first memory 305, which may be either a flip-flop or a latch, thus may be thought of as a one-bit sample and hold circuit. More particularly, on the appropriate phase of the clock signal, for example when the clock signal is high, the output of the threshold circuit 300 is copied into the memory, and that value is frozen into memory when the clock signal goes low. A second memory 310, also typically a flip-flop or latch, stores the old state of the memory 305 in a similar manner, and thus the output of the second memory 310 is equal to the output of the first memory 305 at the end of the previous clock cycle. The clock cycle is, in an exemplary embodiment, synchronized with the LED pulse, with the active edge being at the end of the light pulse. The old state of the memory is supplied to the pixels below and on the left through a "CURRENT STATE" bus 306.

The temporal intensity change ("tic") of a pixel can thus be determined by comparing the states of the first and second memories 305 and 310, respectively. This comparison is performed by comparator logic 315. In addition, the output of the first memory 305 is provided to two additional comparators 320 and 325 to detect edges on the top and at the right, respectively. The comparator 320 also receives information on a line 321 about the current state of the pixel above in the array. The comparator 325 receives information from the pixel on the right through a line 326, or "EDGE ON RIGHT" bus, and supplies information to the pixel on the right through a line 327. The comparators 315, 320 and 325 may each be implemented as Exclusive-Or circuits for simplicity.

Edges at the left and bottom are communicated to this pixel by the pixels at the left and on the bottom, respectively, as can be better appreciated from the portion of the array shown in FIG. 4A. More specifically, as with reference to FIG. 3, the corresponding pixel circuits will inject a current on an associated wire if a tic and a corresponding edge is detected with the result being that edges at the left and bottom are deducted from the values of the corresponding neighboring pixels. Similarly, the detection of a horizontal or vertical edge is signaled by injecting a current on the corresponding wire. Thus, left correlator logic circuit 330 receives information on a line 335 from what may be thought of as a "MOVE LEFT" bus, and also receives information from the adjacent pixel on a line 336, which may be thought of as an "EDGE ON LEFT" bus. Down correlator logic 340 receives information on a line 345 from a "MOVE DOWN" bus, and also from a line 341, supplied from the pixel below as an "EDGE ON BOTTOM" bus. In contrast, up correlator logic 350 receives one input from the circuit 330 and a second input on a line 351, or "EDGE ON TOP" bus, and provides a signal on a line 355, or a "MOVE UP" bus; right correlator logic 360 provides a signal on a "MOVE RIGHT" bus 365. The correlator circuits may be thought of simply as AND gates.

In addition, a pair of switched current sources, 370 and 375, provide a calibrated current injection onto respective busses 380 and 385, when edges are detected; the current source 370 receives its sole input from the EDGE ON TOP bus 351. Thus, when a horizontal edge is detected moving vertically, the current source 370 provides a calibrated current injection on line 380; similarly, when a vertical edge is detected moving horizontally, the current source 375 provides a calibrated current injection on line 385. The lines 321,326, 336 and 341 are all tied to false logic levels at the edges of the array. Calibration is not required in all embodiments.

Referring again to FIG. 4A, the implementation of a four pixel array can be better appreciated, and in particular the manner in which the correlator circuits 330, 340, 350 and 360 tie into adjacent pixel logic can be better understood. Similarly, the manner in which the vertical and horizontal edge detectors 370 and 375 cooperate with adjacent pixels can be better appreciated. In this first exemplary embodiment, an 8×8 matrix of pixels and associated logic has been found suitable, although many other array sizes will be acceptable in particular applications, and an 11×11 matrix is typically used in connection with the embodiments discussed hereinafter. In addition, the 8×8 array is, in an exemplary embodiment, comprised of four 4×4 quadrants, although it is not necessary to decompose the array into quadrants in other embodiments. Arrangement of the array into quadrants is helpful to detect rotation of the ball, although translation may be readily detected without such decomposition. Each quadrant is provided with its own outputs for the four directions of displacement, to permit calculation of displacement to be performed. In other embodiments, It will be appreciated that, basically, six bus lines are provided, with the output of each pixel tied to each bus. Depending on the characteristics of the image in the pixel and its neighbors, one to all six busses may be driven. In essence, the function of the circuits of FIGS. 3 and 4 is that each pixel 200A-n can either drive a preset amount of current onto the associated bus ("ON"), or do nothing. By the use of very precise current drivers, it is then possible to sum the respective currents on each of the busses and determine the number of pixels that are on the bus. The six busses give six numbers, and the six numbers are combined to compute X and Y, or horizontal and vertical, displacements. In a presently preferred embodiment, X and Y displacements can be calculated as:

$$\Delta X = (\Sigma MoveRight - \Sigma MoveLeft)/(\Sigma Edge_x)$$

while $$\Delta Y = (\Sigma MoveUp - \Sigma MoveDown)/(\Sigma Edge_y).$$

The algorithm may be summarized as follows:

| | | |
|---|---|---|
| $Edge_x =$ | Light (sample cell) > c × Light (cell left) or<br>c × Light (sample cell) < Light (cell left) | (Boolean) |
| $Edge_y =$ | Light (sample cell) > c × Light (cell top) or<br>c × Light (sample cell) < Light (cell top) | (Boolean) |
| Color = | Light (sample cell) >c × Light (cell left) or<br>Light (sample cell) >c × Light (cell top) | (Boolean) |
| MoveRight = | $Edge_{x(t)}$ (sample cell) and<br>$Edge_{x(t-1)}$ (cell left) and<br>$Color_{t-1}$ (cell left) = $Color_t$ (sample cell) | (Boolean) |
| MoveLeft = | $Edge_{x(t)}$ (sample cell) and<br>$Edge_{x(t-1)}$ (cell right) and<br>$Color_{t-1}$ (cell right) = $Color_t$ (sample cell) | (Boolean) |
| MoveUp = | $Edge_{x(t)}$ (sample cell) and<br>$Edge_{x(t-1)}$ (cell bottom) and<br>$Color_{t-1}$ (cell bottom) = $Color_t$ (sample cell) | (Boolean) |
| MoveDown = | $Edge_{x(t)}$ (sample cell) and<br>$Edge_{x(t-1)}$ (cell top) and<br>$Color_{t-1}$ (cell top) = $Color_t$ (sample cell) | (Boolean) |

The value of c in the foregoing is a constant chosen to avoid noise and mismatch problems between two adjacent pixels, and in the embodiment described has been chosen to be a value of 2. Also, as previously discussed generally, it will be apparent from the foregoing algorithm that an increase in the number of edges present in the image results in an increase in the precision of the displacement measurement. It will also be apparent that the measured displacement is a fraction of the distance between two pixels. Some calculations may be done digitally or by other techniques.

The effect of a move on the pixels can be graphically appreciated from FIG. 17B, in which a pixel array includes an image comprising some dark pixels D, some light pixels L, and some pixels E which are undergoing an intensity change indicative of the presence of an edge. Thus, if a first oval area F is defined as the image of the ball at a time (t−1), and a second oval area S is defined as the image of the ball at a time (t), the direction of motion can be determined as shown by the arrow.

The difference between the right and left moves (the dividend in the above fractions) is easily implemented with a differential current amplifier having, in at least some embodiments, inverting and non-inverting inputs, as will be better appreciated in connection with FIG. 5B, discussed below.

Referring next to FIG. 5A, a generalized schematic block diagram is shown in which the array 220 is connected to the remaining circuitry necessary for operation as a trackball. The array 220 is connected through signal conditioning logic 505A-B to AD converters 510 and 520 to a microprocessor 530. The A/D converter 510 supplies lines X0, X1 and X2, as well as the sign of the X movement, to the microprocessor on lines 540; likewise, A/D converter 520 supplies lines Y0, Y1 and Y2, as well as the sign of the Y movement, to the microprocessor on lines 550. In some embodiments a four-bit A/D converter plus sign may be preferred, in which case an extension of the present circuit to four bits is believed within the normal skill in the art. Switches 80 supply additional control inputs to the microprocessor 530. The microprocessor provides a clock signal on line 535 to the array and associated circuits, indicated generally at 545, which may for example be implemented on a single sensor integrated circuit. The microprocessor 530 then communicates bidirectionally with line interface logic 560, and the output of the line interface logic 560 provides cursor control signals in conventional form to a host system, not shown, over an output bus 570. It will be appreciated by those skilled in the art that, in the embodiment detailed herein, the microprocessor 530 is used primarily for establishing the protocol for communications with the host, although it does also control LED pulsing, sleep mode and services interrupts.

Figure 5B:
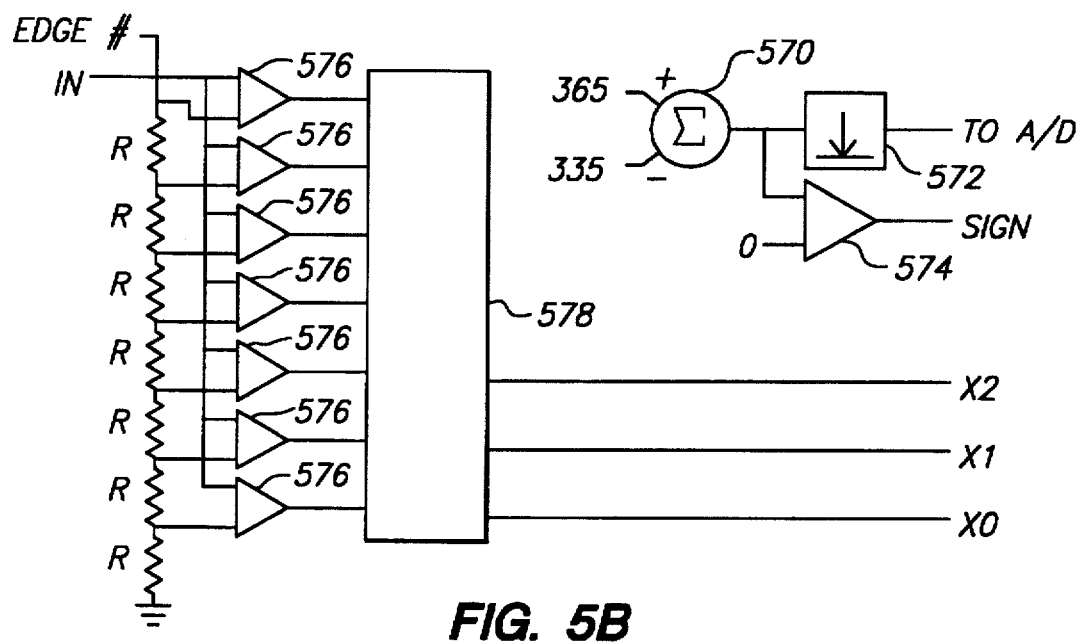
FIG. 5B shows in schematic block diagram form the signal conditioning circuitry of FIG. 5A.

With reference next to FIG. 5B, the signal conditioning circuits 505A-B shown in FIG. 5 can be better understood. For convenience, only the X (horizontal move) signal conditioning circuit is shown in detail; the corresponding Y (vertical move) circuit is functionally identical. As previously noted, the cumulative current signals from the various pixels are summed on their respective busses. These sums of such currents from the "move left" and "move right" busses are subtracted in summing circuit 570, followed by determination of the absolute value in an absolute value circuit 572, after which the absolute value is provided to the A/D converter 510. In addition, sign of the move is determined by providing the output of the summing circuit 570 to a comparator 574. Finally, the sum of the edge currents is compared through a series of comparators 576, the outputs of which are fed to combinational logic 578, and thence provided as X0–X2 outputs. It should also be noted that the A/D conversion of circuits 510 and 520 can be readily implemented using a flash A/D converter. Division can be similarly implemented with a flash A/D converter by using a reference voltage proportional to the bus current for the horizontal (or vertical) edges. Use of current sources for such circuitry provides desirable simplicity and compactness.

Figures 6A, 6B:
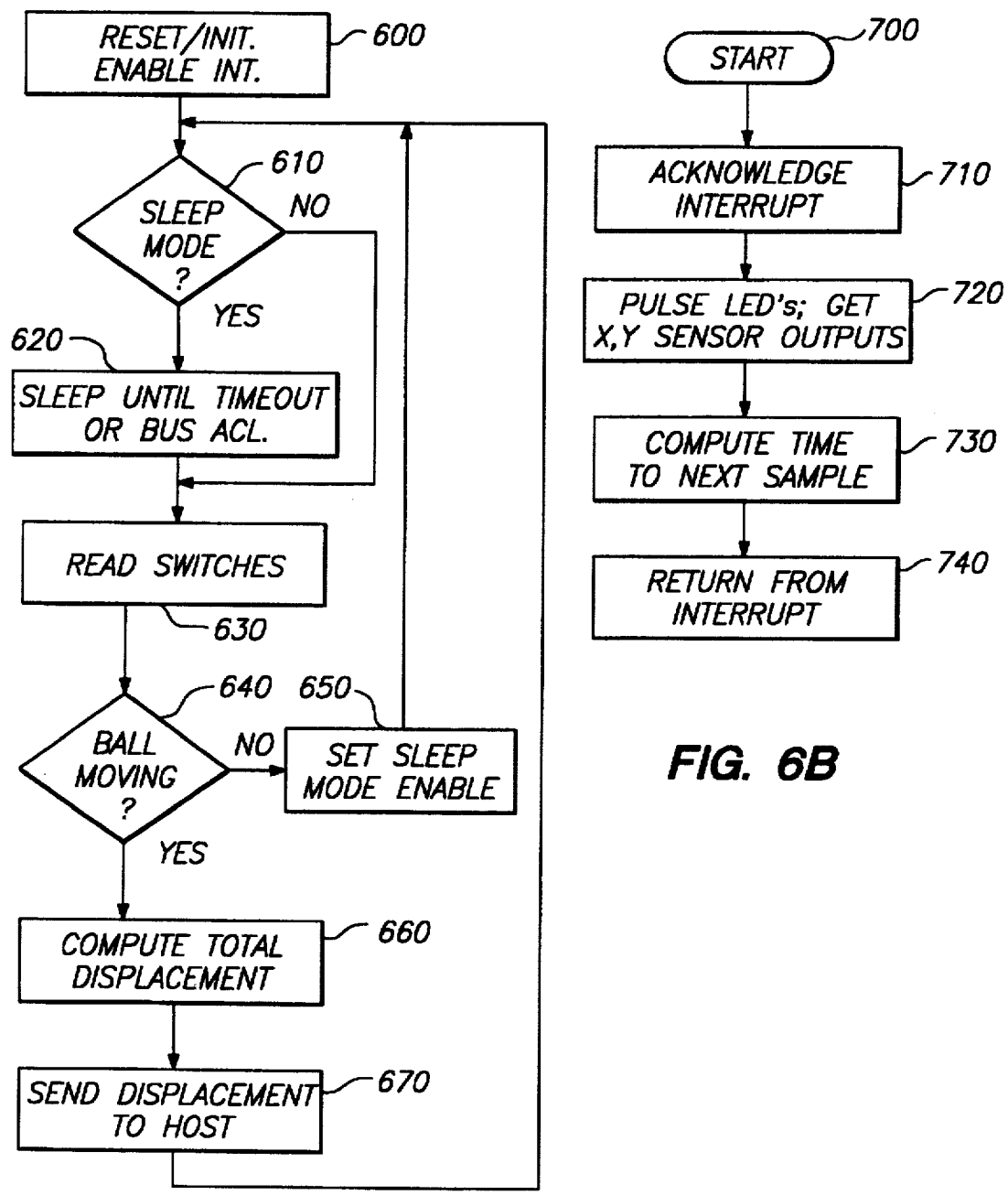
FIGS. 6A–6B show in flow diagram form the operation of the firmware which controls the logic of FIGS. 3 and 4.

Referring next to FIGS. 6A and 6B, the operating program which controls the microprocessor 530 can be better appreciated. Referring first to FIG. 6A, the operation of the system of FIGS. 1–5 begins at step 600 by resetting and initializing the logic, and enabling interrupts. A check is made at step 610 to determine whether the sleep mode has been enabled.

If sleep mode is enabled, reflecting no recent movement of the ball of the trackball, the logic of FIGS. 3–5 sleeps at step 620 until the timeout or the occurrence of bus activity, whichever occurs first. The occurrence of sleep modes is discussed in U.S. patent application Ser. No. 07/672,090, filed Mar. 19, 1991, now abandoned, and assigned to the same assignee as the present invention, the relevant portions of which are incorporated herein by reference. If sleep mode is not enabled, or if a timeout or bus activity has occurred, the switches 80 on the trackball are read at step 630. After the switches are read, a check is made at step 640 to see whether the ball is moving. If not, sleep mode is enabled at step 650.

If the ball is moving, the total displacement is computed at step 660. Following computation of the displacement, the data is provided as an output to the host system at step 670, and the process loops back to step 610.

Referring next to FIG. 6B, the interrupt service routine of the present invention can be better understood. The interrupt service routine is accessed at step 675 whenever a timer function from the microprocessor generates an interrupt, although other methods of generating an interrupt at regular intervals are also acceptable in at least some embodiments. The system responds by acknowledging the interrupt at step 680, followed at step 685 by pulsing the LEDs and sampling the sensor outputs for X and Y. At step 690 the time before a next sample is to be taken is calculated. The amount of time can vary, depending upon whether the displacement of the ball since the last sample is large or small; for example, a sampling rate of once per millisecond is typical during normal movement, with less frequent sampling when the ball is stopped. If the displacement is small, the time between successive samples is increased; if the displacement is large, the time between samples is decreased. In a presently preferred implementation, a "small" displacement represents a movement on the order of $1/400^{th}$ of an inch or less; a "large" displacement will range between $5/800^{th}$ and $7/800^{th}$ of an inch. After computing the time until the next sample, the system returns from the interrupt at step 695.

Figure 7A:
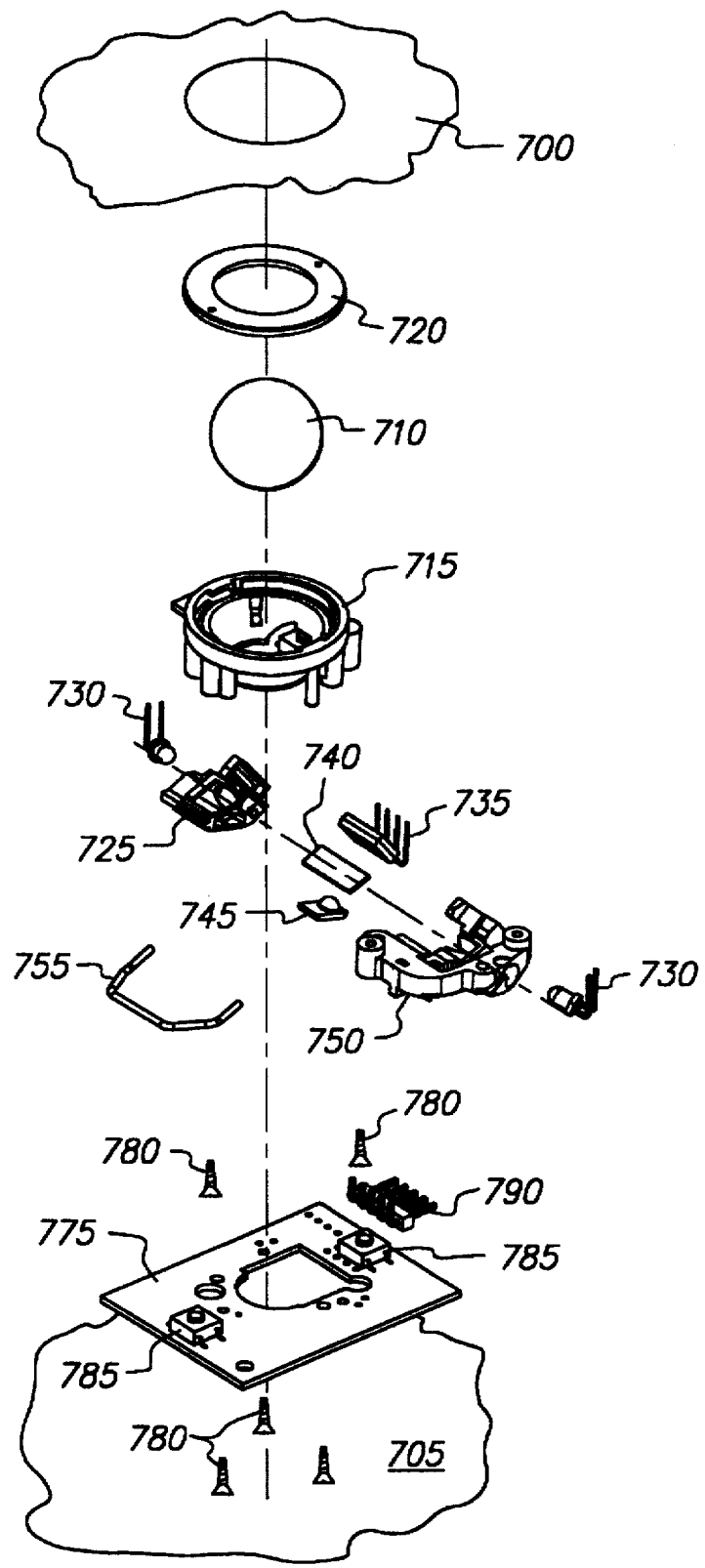
FIG. 7A shows in exploded perspective view a second embodiment of a trackball in accordance with the present invention.
Figure 7B:
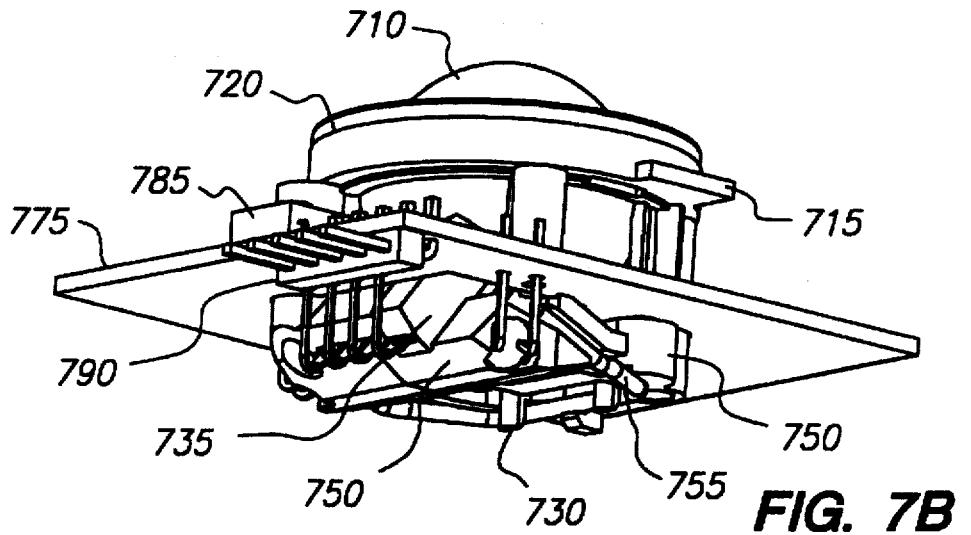
FIG. 7B shows in three-quarter perspective view the assembled elements of FIG. 7A.
Figure 8A:
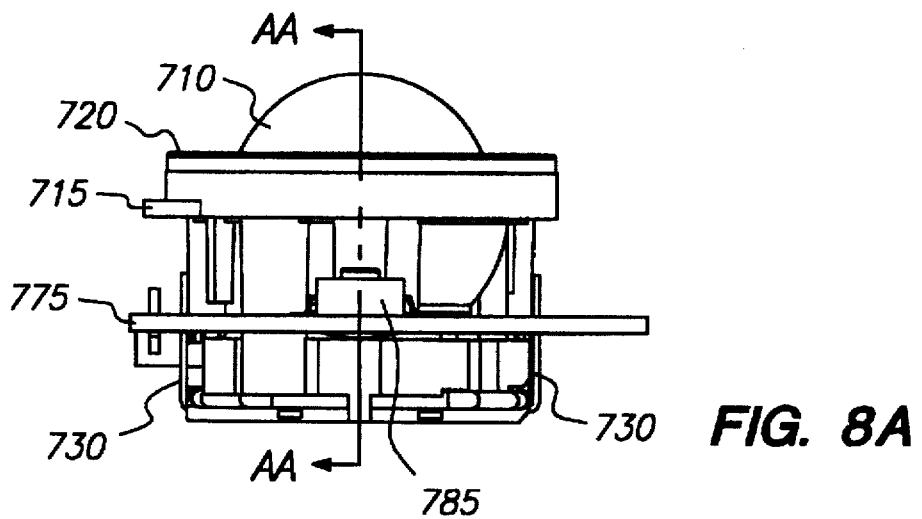
FIG. 8A shows in side elevational view the assembly of FIGS. 7A–B.
Figure 8B:
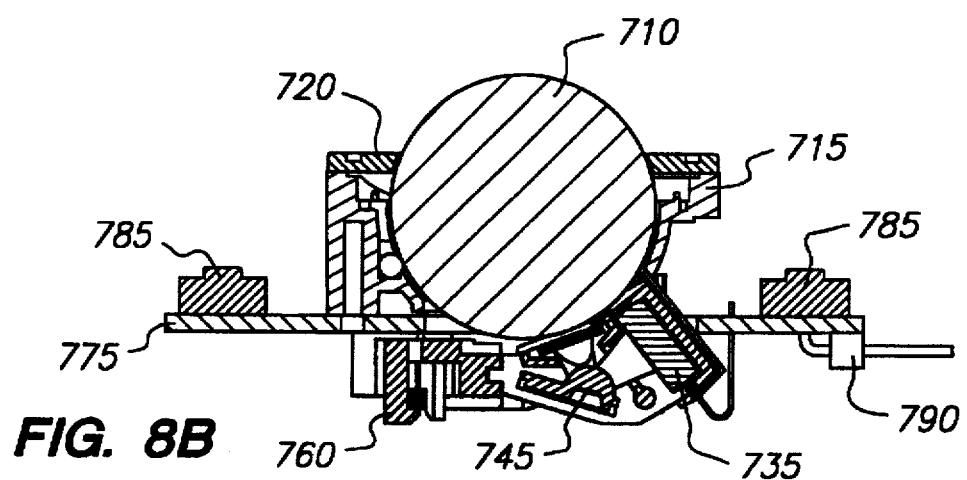
FIG. 8B shows in cross-sectional side view the assembled components shown in FIGS. 7A–B.

Referring next to FIGS. 7A–7B and 8A–8B, an alternative embodiment of the present invention within a trackball is shown in exploded perspective view and indicated generally at 10. FIG. 7B is an assembled view of the exploded perspective view of FIG. 7A, while FIG. 8A is a side elevational view of the assembled device. FIG. 8B is a cross-sectional side view taken along line AA—AA in FIG. 8A.

It will be appreciated by those skilled in the art that the present embodiment comprises essentially four main elements: a ball with a detectable pattern on its surface; one or more light sources such as LEDs to illuminate the ball; a sensor for detecting an image of at least the portion of the ball illuminated by the light sources; and optics to allow the image to be focused on the sensor. In addition, a mechanical framework for supporting the ball, the light sources, the optics and the sensor must be provided. Each of these components will be described in turn, beginning with the mechanical framework.

An upper housing 700 and lower housing 705 are shown in breakaway view, and in at least some embodiments (such as portable or handheld computers or similar devices) will be incorporated into, for example, a keyboard. A ball 710, of the type described hereinabove, is maintained within a ballcage 715 by means of a retaining ring 720 which locks into the upper housing 700. The ball is typically on the order of five to fifty millimeters in diameter, although larger or smaller sizes are acceptable in various applications; in the exemplary embodiment described herein, a ball diameter on the order of 19 millimeters is typical. Situated below the ballcage 715 is an opto housing cover 725, into which is fitted an LED 730 through an angled bore better appreciated from FIGS. 10A–10D. In the exemplary embodiment described here, the LED may be, for example, in the 940 nm range. The opto housing cover 725 also provides a mount for a sensor 735 and a window 740, as well as a lens 745. The opto housing cover 725 then mates to a opto housing 750 and is fastened in position by means of an opto clip 755. A second LED 730 is inserted into the opto housing 750 through a second angled bore, better appreciated from FIG. 11A–11B. The opto clip 755 is retained in position by being fitted under a detent 760 formed on the opto housing 750 (best seen in FIG. 8B). The subassembly 765 formed by the opto housing cover 725 and opto housing 750 and related components is positioned beneath the ball cage 715.

Sandwiched between the ball cage 715 and subassembly 765 is a PC board 775, with the ball 710 viewable by the subassembly 765 through an orifice 770 in a PC board 775. The ball cage 715 is affixed to the PC board 775 by screws 780 or other suitable means, and the subassembly 765 is fastened to the PC board 775 and the ball cage 715 by means of screws 780 which extend through the opto housing 750 and PC board 775 into the ball cage 715. The PC board 775 also includes one or more buttons or switches 785. A connector 790 connects the PC board 775 to a host system (not shown), such as a notebook or other computer, in a conventional manner such as through a serial or PS/2 protocol.

Figure 9A:
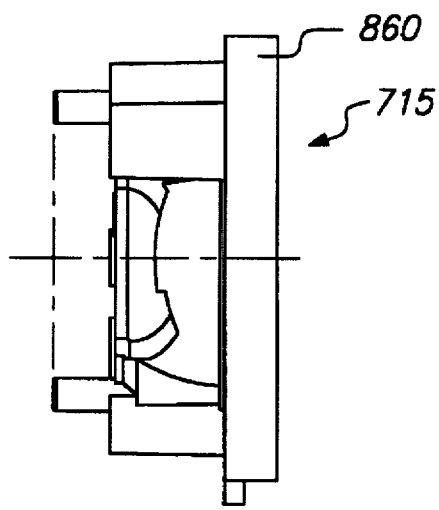
FIGS. 9A–9D show in side elevational, bottom plan, top plan and cross-sectional side view the ball cage shown generally in FIGS. 7A–8B.
Figure 9B:
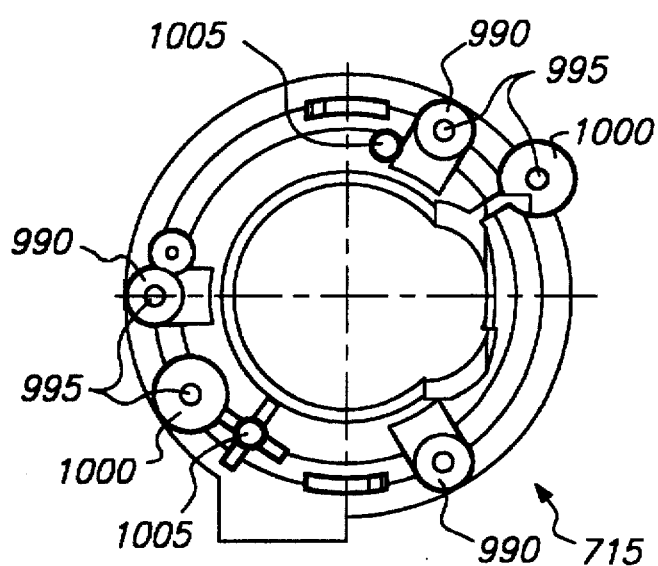
Figure 9C:
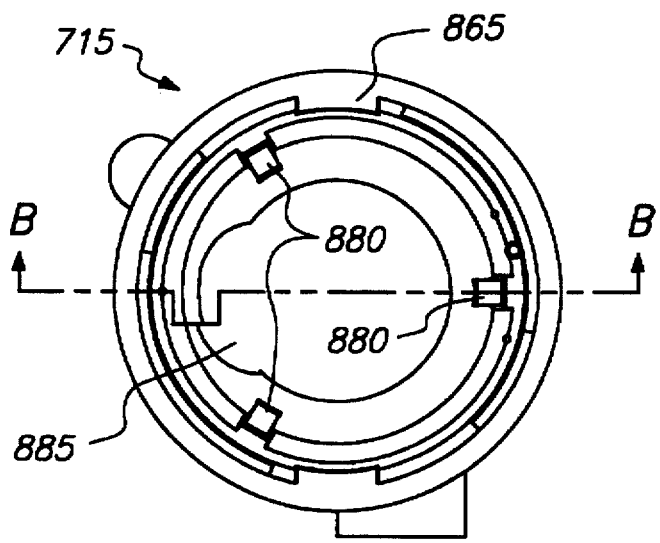
Figure 9D:
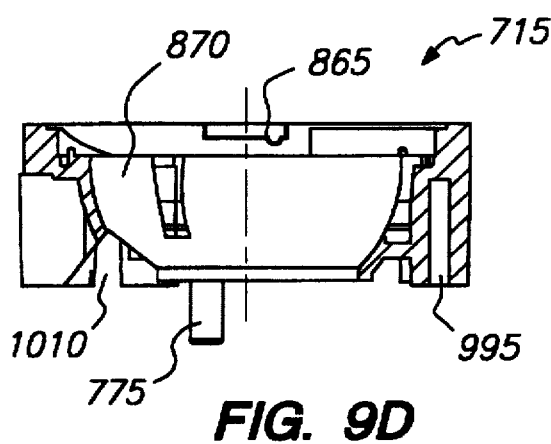

Referring next to FIG. 9A–9D, the ball cage 715 is shown in greater detail. In particular, FIG. 9A shows the ball cage 715 in side elevational view, while FIG. 9B shows it in bottom plan view. FIG. 9C shows the ball cage in top plan view, while FIG. 9D shows the ball cage in cross-sectional side view taken along line B—B in FIG. 9C. The ball cage 715 includes an upper annulus 860 with rotary slots 865 for locking in the retaining ring 720. Below the upper annulus 860 the interior of the ball cage forms a bowl 870. Excavated from the bowl are three slots 875 in which bearings 880 are placed for supporting the ball 710. The bearings 880 are of the type described in U.S. patent application Ser. No. 07/820,500, entitled Bearing Support for a Trackball, filed Jan 14 1992, now abandoned, mentioned previously. The slots are positioned substantially with radial symmetry within the bowl 870. In the bottom of the bowl 870 is an orifice 885 through which the ball may be viewed by the optical portion, discussed generally above and also discussed in greater detail hereinafter. Mounting pads 990 each include a bore 995 for receiving the screws 780 (FIG. 7A), for mounting the ball cage to the PCB 775 (FIG. 7A), while mounting pins or bosses 1000 also include a bore 995 to permit the subassembly 765 to be affixed to the ball cage 715. A pair of guide pins 1005 are also provided for positioning the ball cage relative to the PCB 775.

A flattened portion 1010 (FIG. 9D) is provided to receive and position the sensor relative to the lens and window discussed above in connection with FIG. 7A. The flattened portion 1010 cooperates with the orifice 885 to permit the ball 710 (FIG. 7A) to extend through the orifice so as to be illuminated by light from the LEDs 730 and illuminate a sensor with light diffusely reflected off the ball 710 (FIG. 7A).

Figure 10A:
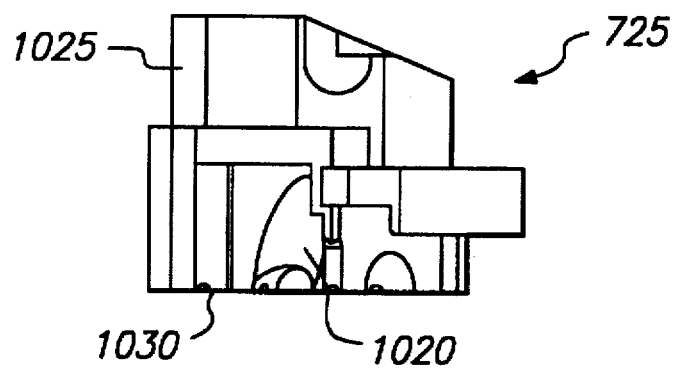
FIGS. 10A–10D show in side elevational, top plan, bottom plan and cross-sectional side view the upper opto housing shown generally in FIGS. 7A–8B.
Figure 10B:
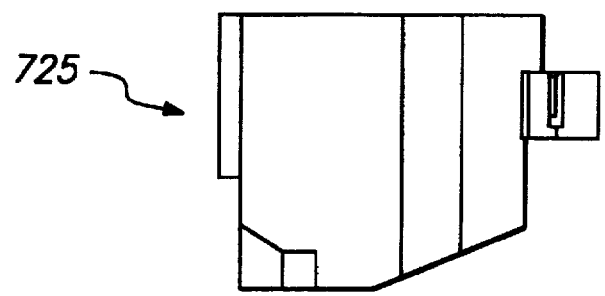
Figure 10C:
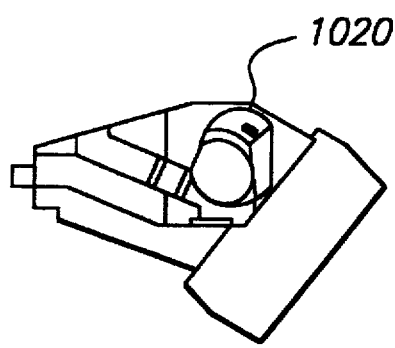
Figure 10D:
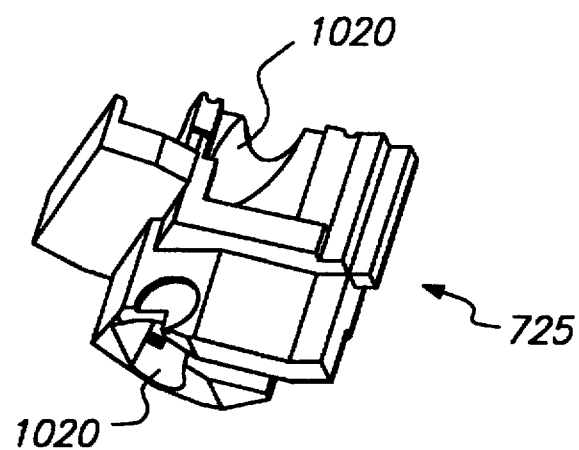
Figure 11A:
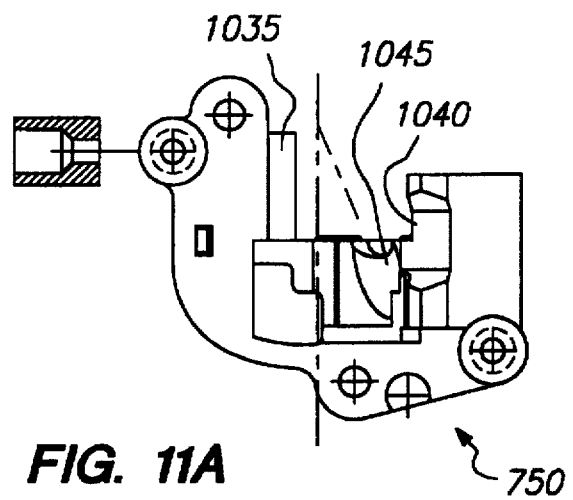
FIGS. 11A–11D show in side elevational, top plan, bottom plan and cross-sectional side view the lower opto housing shown generally in FIGS. 7A–8B.
Figure 11B:
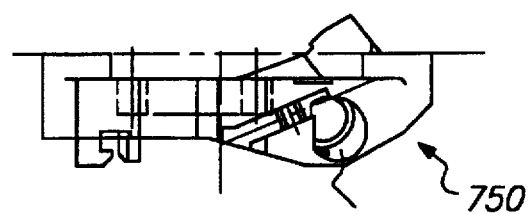
Figure 11C:
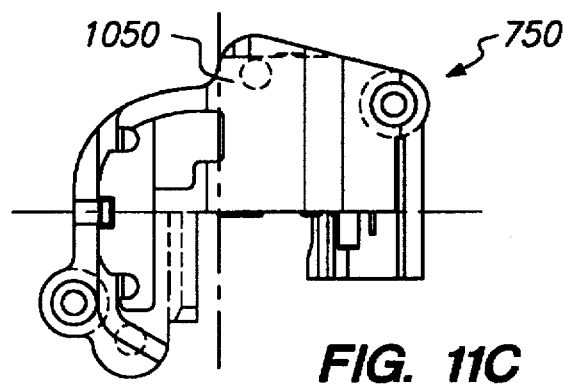
Figure 11D:
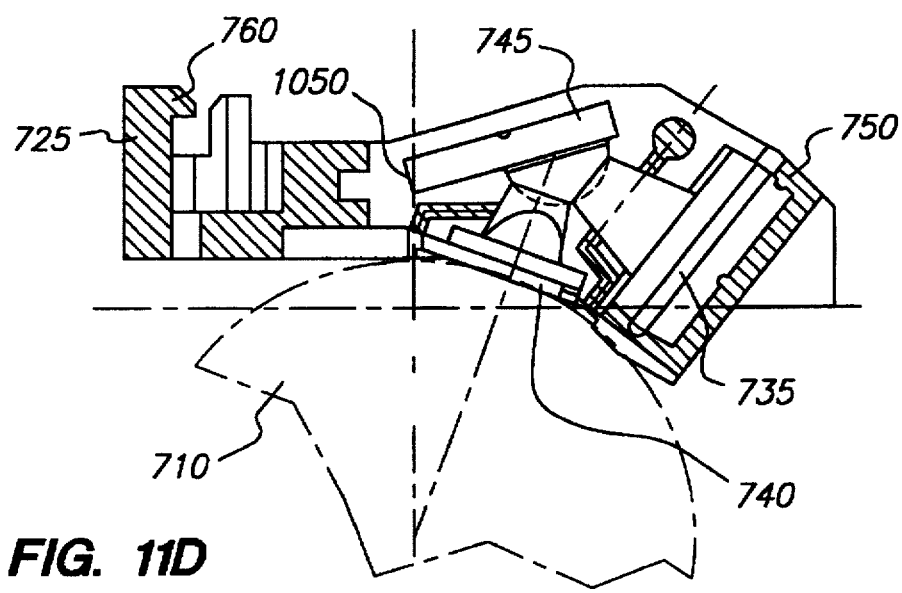

Referring next to FIGS. 10A–10E and FIGS. 11A–11D, the opto housing cover and opto housings can be better appreciated. In particular, the opto housing cover 725 is shown in front elevational view (FIG. 10A), rear elevational view (FIG. 10B), side elevational view (FIG. 10C), and front and rear perspective view (FIG. 10D). The opto housing 750, which mates to the upper housing 725, is show in top plan view in FIG. 11A, in side elevational view in FIG. 11B, and in bottom plan view in FIG. 11C. In FIG. 11D, the combination of the opto housing cover, opto housing, lens, mirror and sensor are shown assembled in cross-sectional side view in relation to the ball.

With particular reference to FIGS. 10A–10D, the opto housing cover 725 functions to position the LEDs 730 in a manner which floods a selected portion of the ball 710, while also positioning the lens, window and sensor relative to the ball so that light reflected from the ball impacts the lens and, from there, the sensor. The housing 725 includes an angled bore 1020, at the outside end of which one of the LEDs may be positioned. The bore communicates with the central portion of the upper housing. A raised member 1025 positioned substantially at the center of the upper housing provides support for one end of the window 740, while the lens 745 is supported within a recess 1030 partially formed in the upper housing 725. The raised member 1025, as well as the recess 1030, join with mating portions 1035 and 1040, respectively, of the opto housing 750, as shown particularly in FIG. 11A. In addition, as shown in both FIGS. 11A and 11B, the opto housing includes an angled bore 1045 symmetrical to the bore 1020 for supporting the second of the LEDs 730 which, like the first LED, illuminates the lower portion of the ball 710 so that diffuse light is directed onto the sensor 735. As noted previously, diffuse light is presently preferred because of the improved contrast it provides on the light and dark sections of the ball 710.

In addition, the lower housing 750 also includes a recess 1050 to receive the sensor 735, as better appreciated in FIG. 11D.

FIG. 11D, which is a cross-sectional side view of the upper and lower housings together with lens, sensor and window, illustrates the relationship between the key optical elements of this embodiment. In particular, the opto housing cover 725 can be seen to mate with the opto housing 750, with the two opto housings cooperating to position and support the lens 745 in alignment between the ball 710 and the sensor 735. The window 740 is interposed between the ball and the lens, and in those embodiments which use infrared illumination of the ball may be made from a material which appears black in the visible spectrum but is transparent to infrared frequencies, which allows extraneous visible light (such as might enter between the ball and retaining ring) to be filtered out. In addition, the retaining clip 760 can be seen on the underside of the lower housing 750. Not shown in FIG. 11D are the bores through which the LEDs 730 illuminate the ball 710.

To better understand the optical path of the embodiment shown in FIGS. 7–11, FIGS. 12A–12C show the operation of the optics in simplified form. In particular, in the simplified drawing of FIG. 12A, the ball 710 is retained within the ball cage 715 by the retaining ring 720. A pair of LEDs 730 illuminate the lower portion of the ball, with the light diffusely reflected through a transparent portion onto the lens 745 and thence onto the sensor 735. In addition, other aspects of this embodiment which can be appreciated from this simplified view are the seal formed by the retainer ring, which helps to prevent dust and dirt from entering the ball cage, and the transparent window which further assists in preventing dirt from blocking the optics.

Figure 12A:
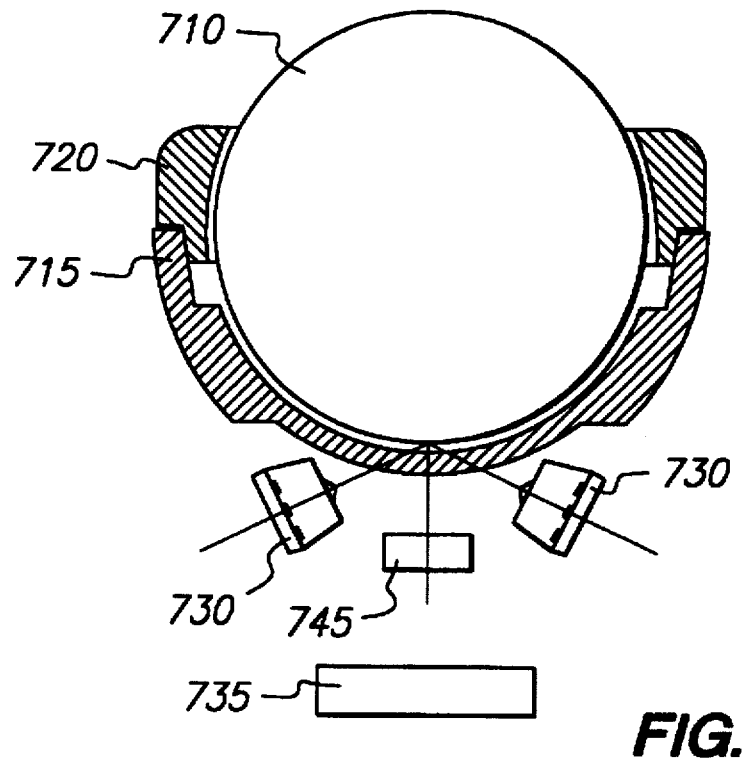
FIG. 12A shows in simplified cross-sectional side view the operation of the optics of the invention.
Figure 12B:
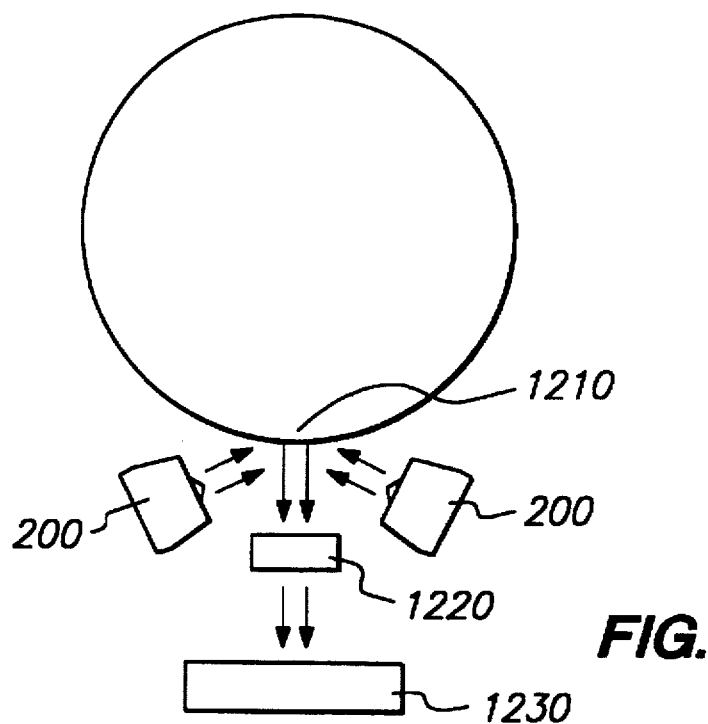
FIG. 12B shows in simplified cross-sectional side view an arrangement of a lateral sensor according to the present invention.

Referring next to FIG. 12B, the optical arrangement for a classical lens in an in-line arrangement of ball, lens and sensor are shown. In particular, an area 1210 of the ball is illuminated from the LEDs discussed previously. Diffuse light from the illuminated portion of the ball passes through a lens 1220 and strikes a sensor 1230. The lens, which may be made of glass or any suitable optical plastic such as polymethylmethacrylate (typically polished or molded such as by hot pressing), may be a simple biconvex lens having both radii equal to, for example, 2.37 mm where the thickness of the lens is on the order of 1.23 mm and the distance from the ball to the nearest lens surface is on the order of 4.35 mm. Similarly, the distance from the sensor to the nearest lens surface is on the order of 4.42 mm. In such an arrangement the field of view of ball is about 2.8 mm in diameter. The optically free diameter of the lens is preferably limited, and in the foregoing example may be limited to about 1.5 mm aperture. The optical limits may be imposed by mechanical or other means.

Figure 12C:
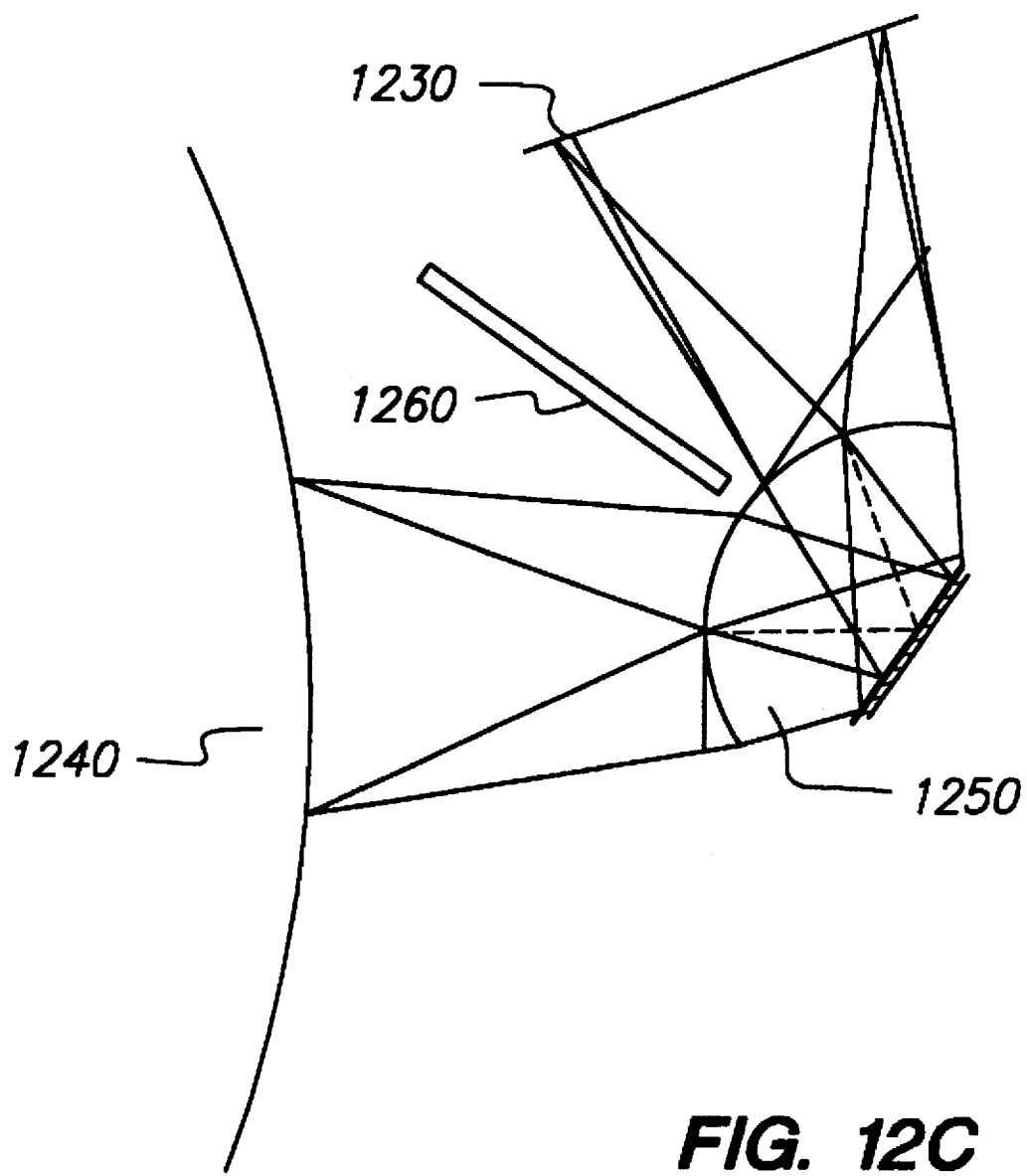
FIG. 12C shows is simplified cross-sectional side view the operation of the optics according to an embodiment of the present invention.

Referring next to FIG. 12C, the optical arrangement for a classical lens in a lateral arrangement of ball, lens and sensor are shown. This approach, which is presently preferred and shown in the second and third embodiments herein described, involves a folded light path. In particular, an area 1240 of the ball is illuminated from the LEDs discussed previously. Diffuse light from the illuminated portion of the ball passes through a portion of a plano-convex lens 1250, which is hemispherical in an exemplary embodiment. As before the lens may be made of polylmethacrylate (PMMA), but now has a flat, mirrored back surface. The size of the mirrored area provides an aperture stop equivalent to that required in the in-line arrangement of FIG. 12B, and in the embodiment described herein may be, for example, on the order of 1.8 mm aperture where the field of view of the ball is again 2.8 mm, but the lens-to-ball distance is on the order of 3.2 mm and the lens to sensor distance is on the order of 3.3 mm. In this example, the radius of the lens may be on the order of 1.75 mm. The total deflection angle of the lens is not especially critical, and for the embodiment described may vary between seventy-two and ninety degrees without deterioration of optical performance. A baffle 1260 may be provided to ensure that no light from the ball strikes the sensor directly. In the event the sensor is covered with a protection layer (usually epoxy), the distance between the lens and the sensor may need to be increased by an amount of about one-third of the thickness of the protective layer. Such a simplified correction term is adequate for layers up to one millimeter thickness with a refractive index of 1.5±0.05. Alternatively, the surface of the protection layer may be curved to form a negative lens, which will act as a field flattener and thereby reduce the image field curvature. This would tend to improve the resolution and contrast in the border area of the sensor.

Figure 13:
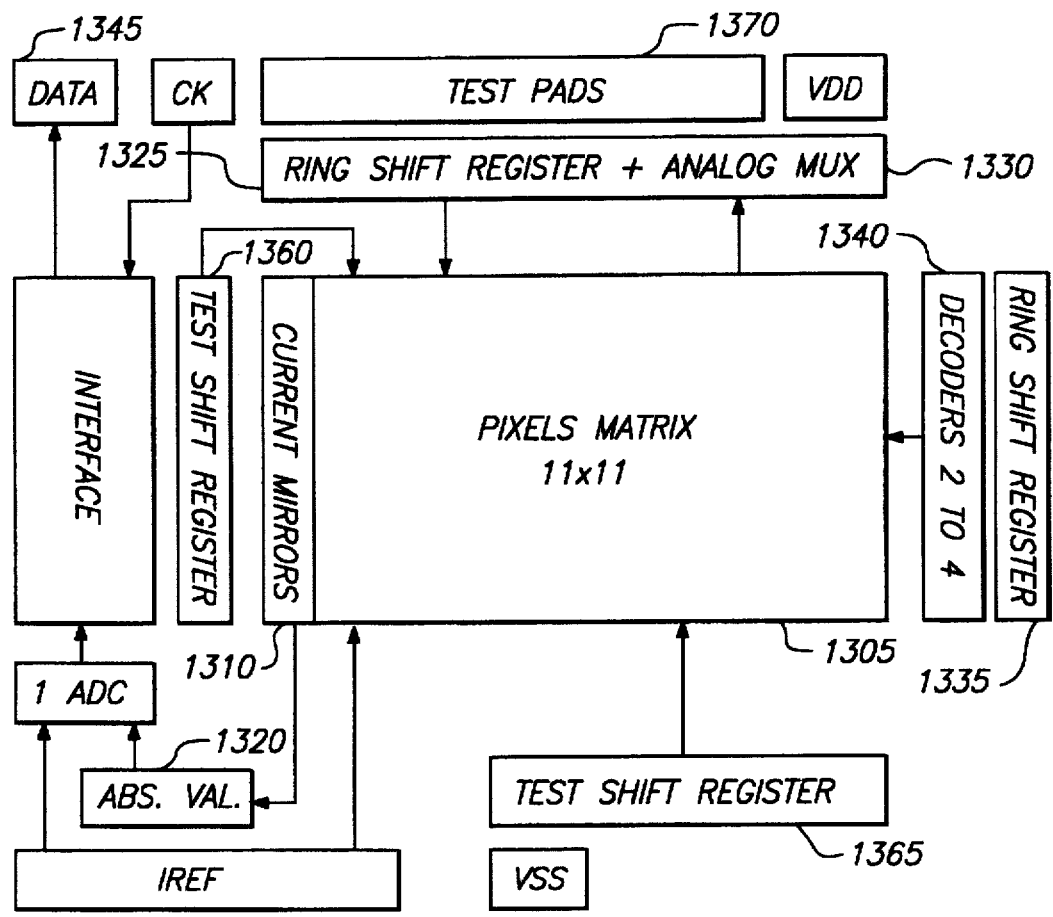
FIG. 13 shows in block diagram form the components of the lateral sensor of the present invention.

With reference next to FIG. 13, the operation of the sensor electronics of the embodiment shown in FIG. 7A can be better appreciated. In general, the electronics associated with the second embodiment described above is in some respects presently preferred over that associated with the first embodiment described above, although each approach has merit. In general, the electronics implemented in the second embodiment comprises an array of pixels composed of both the photodiode to detect the image and the circuitry both to perform the calculation and store the information, together with appropriate electronics to communicate that information to a host system. From the description of FIG. 5A, it will be apparent that the circuits of FIG. 13 are essentially a replacement for the sensor circuit 545 shown in FIG. 5A. In particular, as shown in FIG. 13, the logic associated with the device of FIG. 7A includes a pixel matrix 1305, which is typically an 11×11 array of photodiodes and associated circuits but could be substantially larger in at least some embodiments. The circuit also includes a current-based A/D converter circuit 1315 substantially similar to that shown in FIG. 5B but expanded to four data bits plus sign, an absolute value circuit 1320 substantially the same as shown in FIG. 5B (which supplies the sign for the 4 bit data word from the A/D converter), a top ring shift register 1325 and an analog mux 1330, a right ring shift register 1335 and an associated plurality of two-to-four decoders (eleven for an 11×11 array) 1340, data storage logic 1345, a current reference circuit 1350, and interface logic 1355. In addition, the logic includes a first test shift register 1360 for the rows on the left of the matrix 1305, together with a second test shift register 1365 for the columns in the bottom of the matrix. For a matrix of 11×11, each shift register is eleven bits, but it will be apparent that the size of the shift register could be varied over a very large range to correspond to the number of pixels on one side of the matrix. In addition, a plurality of test pads 1370 is also provided, as are $V_{DD}$ and $V_{ss}$ circuits. The A/D converter circuit for the exemplary embodiment described herein is preferably a sequential, asynchronous device to reduce the circuitry required for implementation, although in other embodiments a parallel converter may be preferred. In addition, in some embodiments a sample and hold circuit can be provided ahead of the A/D converter circuits.

In the logic of FIG. 13, all of the digital blocks operate under the control of the interface logic 1355, which also interacts with the primary analog elements. In turn, the chip is typically controlled via a microcontroller, as illustrated previously. The interface logic uses only synchronous logic blocks, as is therefore capable of being controlled by a synchronous state machine with a counter, such as a seven bit counter for the embodiment of FIG. 13. In addition, for the embodiment described no "power-on-reset" function is required, since the logic reaches a deterministic state after a predictably small number of cycles, such as about 150 cycles with the bidirectional (or input and output) "data" line forced high for the exemplary embodiment shown.

Figure 14:
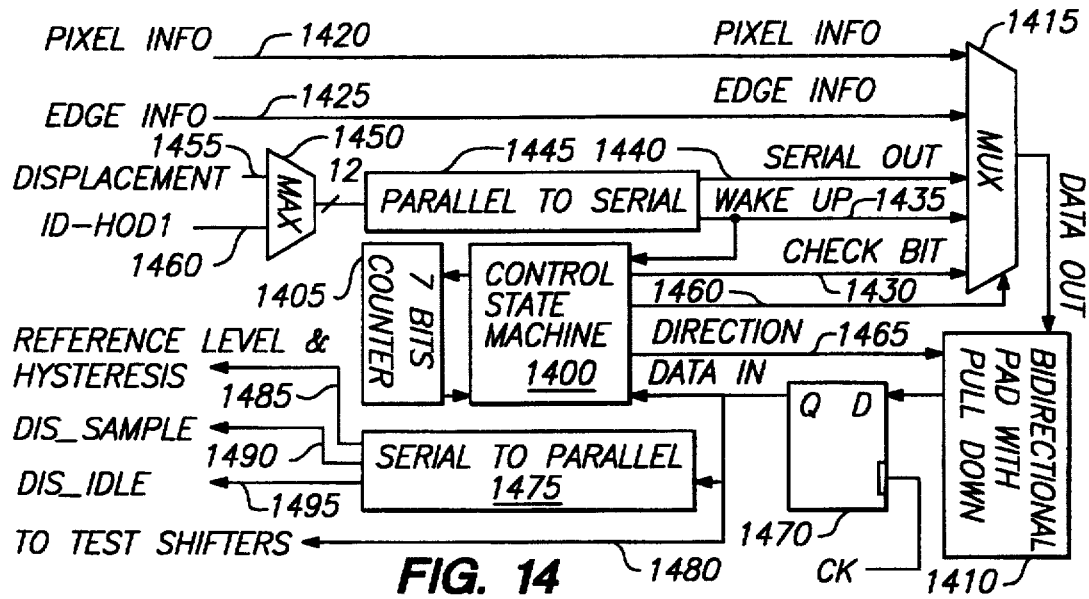
FIG. 14 shows in schematic block diagram form the interface logic included within the sensor of FIG. 13.

Referring next to FIG. 14, the architecture of the interface logic 1355 may be appreciated in greater detail. A control state machine 1400, operating in connection with a seven bit counter 1405, operates generally to select from among various inputs to place data on a bidirectional pad 1410 by control of a mux 1415. The counter 1405 can be preset or can decrement its current count by means of a signal from the state machine 1400. In addition, if the count in the counter 1405 is null, the state machine is forced to change state by means of a signal supplied to the state machine.

The inputs to the mux 1415 include pixel information on line 1420, edge information on line 1425, a check bit on line 1430, or either wake up information on line 1435 or serial data out on line 1440. Both the wake up information and the serial data out information are provided by a parallel to serial converter 1445, which receives its input from a mux 1450 having, for the exemplary embodiment shown, a twelve bit output. The input to the mux 1450 can be either displacement data on line 1455, or predetermined ID information, such as ID='HOD1 on line 1460. It will be apparent that the function of the mux 1450 is to select one of its two inputs for supply to the parallel-to-serial converter 1445, and is controlled by the state machine 1400. It will be noted that neither pixel information on line 1420 or edge information on line 1425 is latched in the exemplary embodiment, to allow real-time switching. However, it may be desirable in some embodiments to provide such latching. The check bit on line 1430 is toggled after any image sample, and allows the processor to determine whether the chip is synchronized to ensure proper communications.

The particular input chosen to be passed through the mux 1415 is selected by control lines 1460 from the state machine 1400, which also supplies direction information on line 1465 to the bidirectional pad 1410 to determine whether signals flow to or from the pad 1410. If the state machine 1400 is seeking information from the pad 1410, the incoming data can be latched into a D flip-flop 1470, where the clock is controlled by the state machine 1400. Data at the output of the flip-flop 1470 is then supplied to the state machine 1400, a serial-to-parallel converter 1475, and to a plurality of test image simulation circuits 1480 for diagnostics. The signals which can be supplied to the remainder of the circuitry from the serial-to-parallel converter 1475 include reference level and hysteresis, on line 1485, dis__sample on line 1490, and dis__idle on line 1495.

Figure 15:
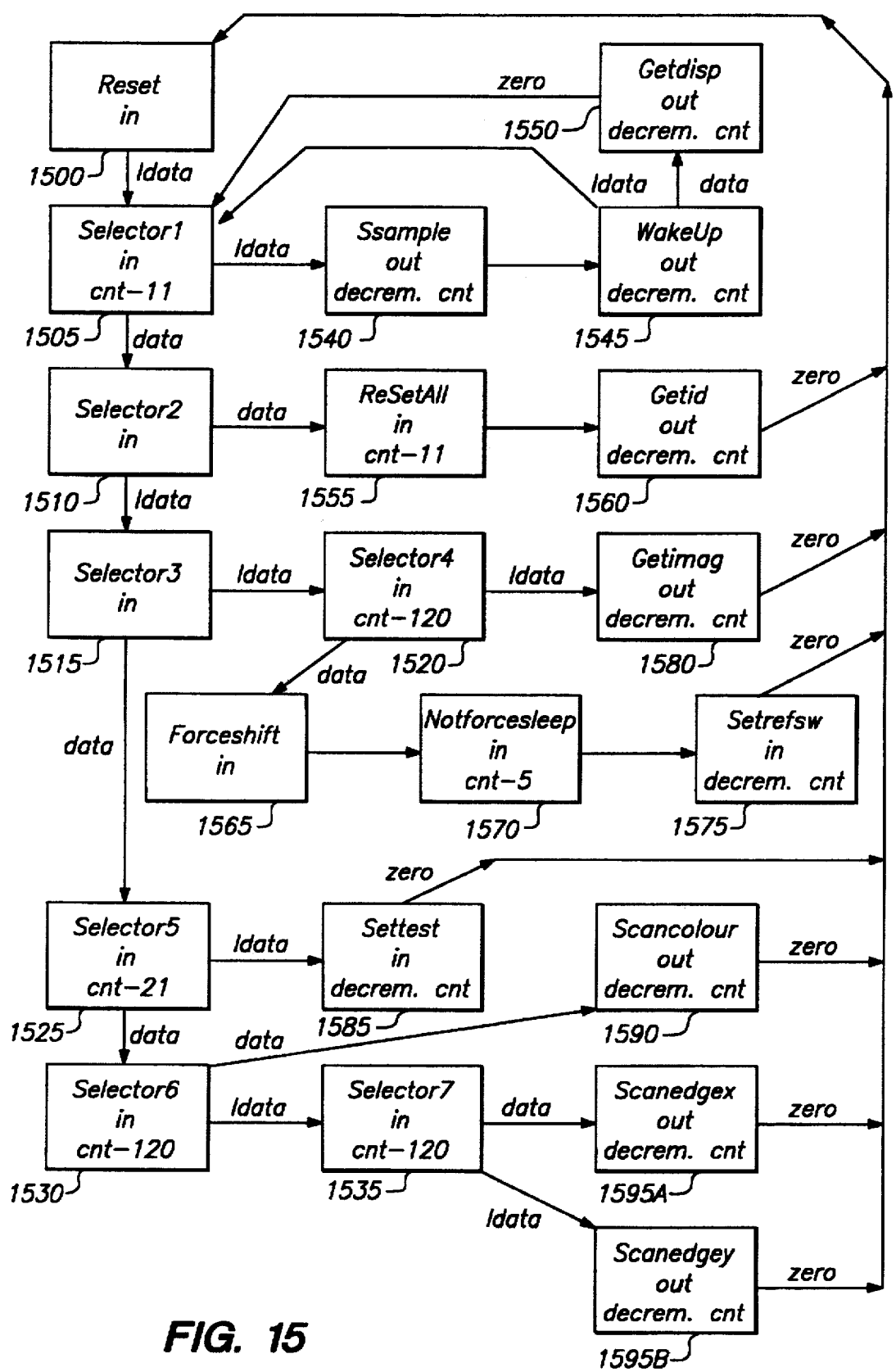
FIG. 15 shows in state diagram form the operation of the state machine included within the interface logic of FIG. 14.

Referring next to FIG. 15, the operation of the state machine 1400 is shown in greater detail in the form of a state diagram. As will be apparent from FIG. 14, the state machine is controlled from two inputs: one from the seven bit counter 1405, when the counter reaches a null value, and another from data in from the bidirectional pad 1410 through the D flip-flop 1470. In the drawing, "in" means that the microcontroller associated with the sensor chip must force a logical level on the data pad 1410, while "out" means that the interface logic 1355 will drive a logical level on the "data out" line from the mux 1415. Each box of the state diagram of FIG. 15 shows the name of the state as well as the operation performed, such as a pre-set to a certain value or a decrementing. In the exemplary embodiment shown, states will typically change on the rising clock edge, and control inputs are latched on the fall edge of the clock signal. Essentially, at the end of each cycle, the machine moves to the state for which the condition is true; but if no condition is true, the state remains unchanged for that cycle. Such a condition can occur, for example, when the machine forces the counter to decrement. It will be appreciated by those skilled in the art that the conventions used in the C programming language have also been used in FIG. 15.

Operation begins at RESET step 1500, typically following an initialization step. For the exemplary embodiment shown, a typical reset can occur by applying a predetermined number of clock cycles with the "data" line forced high. Alternatively, a pull up arrangement could be implemented and the data line forced low to achieve an equivalent result. The maximum number of cycles necessary to reach a known or "reset" state from an unknown, random starting state can be derived by inspection of FIGS. 13 and 14. For the embodiment shown, the maximum number of cycles necessary to reach a determined state is 143, which occurs when the initial state is "wakeup". For conservative simplicity, approximately 150 cycles may be used. Alternately, a more conventional reset can be provided. Following the RESET step, the state machine moves to one of seven selector states, SELECTOR1–SELECTOR7, indicated at reference numerals 1505–1535, respectively, which allows the microcontroller to choose among different operations to be performed. If the SELECTOR1 state indicated at 1505 is selected, the next state is the SSAMPLE, indicated at 1540. The SSAMPLE state is the first state of the displacement reading loop. In this state, "data" is driven with the "check__bit" value (shown as 1430 in FIG. 14). If the value of "dis__sample" on line 1490 (FIG. 14) is low, pixel currents from the pixel matrix 1305 (FIG. 13) are sampled on the falling edge of the clock signal CK in a manner described in greater detail hereinafter. Upon leaving the state, the "check__bit" signal on line 1430 (FIG. 14) is toggled and the displacement is latched into the parallel-to-serial register/converter 1425. The displacement data is later shifted out. Following the SSAMPLE state, the state machine 1400 moves to the WAKEUP state 1545, where "wake-up" information is put on "data". For the exemplary embodiment shown, a wake-up occurs where there is sufficient X or Y movement to exceed the hysteresis programmed into the system. This can be expressed as "wake-up"=((X [3:0] AND hysteresis) OR (Y[3:0] AND hysteresis)≠0). If the result is a one, or high, the edges are latched in the pixels when "CK" is low. A high result means that the state machine moves to the GETDISP state 1550; a low result means that the state branches back to the SELECTOR1 state 1505. The microcontroller is able to force the machine to branch to the GETDISP state 1550 by forcing up the "data" level, but the edges in the pixels will not be latched. The machine thereafter advances by returning to the SELECTOR1 state 1505.

If the SELECTOR2 state 1510 was selected, the next state is RESETALL, indicated at 1555. If "data" is high, a general reset is performed. All test shift registers (FIG. 13) and switches are reset to 0, and the hysteresis reference level is reset to 'B11110; likewise, sample is enabled, normal sleep mode is enabled, and the checkbit is cleared. However, if "data" is low, no operation is performed. The machine then advances to the next state, GETID, indicated at 1560, and identification bits are put serially on "data", with the most significant bit first, for example 'B000011010001. The machine next returns to the RESET state 1500.

If the SELECTOR4 state was selected, and "data" is high, the machine advances to the FORCESHIFT state, indicated at 1565. If "data" is high, the edges are latched in the pixels during the Low phase of "CK", and the current edges replace the old edges. The machine then advances to the NOT-FORCESLEEP state, indicated at 1570, where, if "data" is Low the chip is in sleep mode during the Low phase of "CK". On the next cycle the machine advances to the SETREFSW state, indicated at 1575. In this state the values of different switches and reference levels (or hysteresis values) can be defined. In order of priority, dis__sample is set and, if high, no image sample is done at the "SSAMPLE" state and edges for the current image are frozen. The sensor chip is thus in a high power consumption mode. Next in priority, dis__idle is set, but only has meaning if dis__sample is low. If dis__sample is low and dis idle is also low, edges for the current image are held only during the low phase of "CK" in the "SSAMPLE" state, during the "WAKEUP" state, and the first high phase of "CK" in the "GETDISP" or "SELECTOR1" states. If the dis idle bit is low, the edges are held everywhere except in the high phase of "CK" in the "SSAMPLE" state. Those skilled in the art will recognize that power will be wasted if this bit is active. For the particular embodiment shown, the reference level, or hysteresis, is set by four bits, with MSB first. The machine thereafter returns to the RESET state 1500 when the counter 1405 (FIG. 14) reaches a zero.

If the value of "data" had been low, or "!data" at the SELECTOR4 state, the machine would next have advanced to the GETIMAG state, indicated at 1580. In this state, an image scan is performed by comparing pixel currents one by one with a reference current. The details of this operation have been treated generally in connection with the first embodiment, described above, and will be described in greater detail hereinafter. After the image scan is completed, the machine returns to the RESET state 1500 in response to a zero from the counter 1405 (FIG. 14).

If the SELECTOR5 state was selected, the machine would thereafter advance to the SETTEST state, indicated at 1585. The SETTEST state is used for testing the operation of the pixel matrix 1305. The machine will remain in this state for enough clock cycles to cycle through each column and row of pixels; thus, for an eleven by eleven matrix, the machine remains in the SETTEST state for twenty-two clock cycles. The bits on "data" are sampled and shifted in the test shift registers to create an artificial image, which may then be analyzed to ensure proper operation of the system. The machine thereafter advances to the RESET state 1500 in response to a null value in the counter 1405.

If the SELECTOR6 state was selected, the machine would next advance to the SCANCOLOR state, indicated at 1590. In this state color information is scanned in a manner analogous to the operation of the system in the GETIMAG state 1580. Thereafter, the machine would advance to the RESET state 1500 in response to a null value in the counter 1405. Similarly, if the SELECTOR7 state had been selected, and "data" was high, the machine would advance to the SCANEDGEX state, indicated at 1595A, where "edge X" information is scanned. Alternatively, if "!data" was present, the machine would advance to the SCANEDGEY state, indicated at 1595B, where "edge Y" information would be scanned. The sequence of operation for the remainder of the system during the SCANEDGEX and SCANEDGEY states is the same as for the GETIMAG state 1580. After either state, the machine returns to the RESET state 1500 in response to a null value on the counter 1405 (FIG. 14).

Set forth below in table form is the signal driven on the "data" lines of the bidirectional pad 1410 (FIG. 14) when the sensor of FIG. 13 is in the output mode:

| STATE NAME | SIGNAL |
| --- | --- |
| SSAMPLE | check bit |
| WAKEUP | wakeup |
| GETDISP | serialout |
| GETID | serialout |
| GETIMAG | pixel info |
| SCANCOLOR | edge info |
| SCANEDGEX | edge info |
| SCANEDGEY | edge info |

In addition, it is necessary to avoid any loops in the unused states of the machine. The state attribution table is shown below:

| STATE NAME | STATE VALUE |
| --- | --- |
| RESET | 'H00 |
| WAKEUP | 'H01 |
| SELECTOR6 | 'H02 |
| SELECTOR7 | 'H03 |
| SETTEST | 'H04 |
| SETREFSW | 'H05 |
| SELECTOR2 | 'H06 |
| SELECTOR3 | 'H07 |
| SCANEDGEY | 'H08 |
| SELECTOR4 | 'H09 |
| SELECTOR1 | 'H0A |
| SCANEDGEX | 'H0B |
|  | 'H0C |
| RESETALL | 'H0D |
|  | 'H0E |
| GETIMAG | 'H0F |
| GETID | 'H10 |
| SELECTOR5 | 'H11 |
| GETDISP | 'H12 |
|  | 'H13 |
| SSAMPLE | 'H14 |
| SCANCOLOR | 'H15 |
|  | 'H16 |
|  | 'H17 |
| FORCESHIFT | 'H18 |
|  | 'H19 |
|  | 'H1A |
|  | 'H1B |
| NOTFORCESLEEP | 'H1C |
|  | 'H1D |
|  | 'H1E |
|  | 'H1F |

State values having no state name are unused; in addition, in the exemplary embodiment shown, the state machine has been designed to reset after only one clock cycle in the event the machine enters into one of the unused states.

Referring next to FIG. 16, the organization and operation of the pixel matrix 1305 (FIG. 13) may be better understood. As previously noted, an 11×11 pixel matrix has been used in the second exemplary embodiment. The resulting 121 pixels are divided into four types: type P, which denotes a standard pixel with photodiode, amplifier, current comparator and digital memory for storing edge information; type D, which denotes a pixel with a diode and amplifier only; type E, which denotes an empty pixel; and type T, which is a test pixel biased like a type P or D, but with its output connections tied to test pads rather than connected to the displacement calculation circuitry. The type P pixels provide the conventional image data used by the remainder of the sensor.

The type D are used to define border conditions and to provide its illumination current to neighboring pixels. The type E sensors are used for signal routing purposes. Finally, the type T pixels are accessible externally for test purposes only. From the arrangement of pixels in FIG. 16, it will be apparent that type P pixels predominate in the center of the sensor, while the type D pixels define a perimeter around the type P pixels. During any scan, the matrix is addressed row by row through incrementing of the column index, or:

(row#0, col#0), (row#0, col#1), (row#0, col#2) . . . (row#0, col#10), (row#1, col#0) . . . (row#10, col#10).

It will be appreciated that, for the exemplary pixel arrangement shown in FIG. 16, the origin has been arbitrarily defined as the lower right corner.

During the various scans of the pixel matrix 1305, various information will be provided from the various types of pixels. Set forth below in table form are the types of information expected from addressing the specified pixel type during the different types of scans, with the associated state of the state machine 1400 in parentheses:

| | Type P | Type D | Type E | Type T |
| --- | --- | --- | --- | --- |
| Pixel Information (Get Image) | Current Comparison result ($I_{pix} - I_{ref} > 0$) | Current Comparison result ($I_{pix} - I_{ref} > 0$) | 0 if $I_{ref} > 0$ | Current Comparison result ($I_{pix} - I_{ref} > 0$) |
| Edge X Information (scanedgex) | Edge X (comparison with the left) | 1 | 1 | Edge X (comparison with the left) |
| Edge Y Information (scanedgey) | Edge Y (comparison with the top) | 1 | 1 | Edge Y (comparison with the top) |
| Color Information (scancolor) | Color | 1 | 1 | 1 (*) |

In the exemplary embodiment shown, the value of the current $I_{ref}$ cannot be null to avoid floating nodes. The current $I_{ref}$ can be set through the reference level, or hysteresis, as described above in connection with the description of the state machine 1400.

The entries in the table having an asterisk are valid only in the absence of current injection through the test pads. For test purposes, the interface 1355 (FIG. 13) can be placed in a special mode to force an artificial image. The artificial image is formed with pseudo-active pixels, which are of types D and T, at the crossings of two perpendicular active lines by entering two test words, one for lines and one for columns. The artificial image can be cleared with a data High during the RESETALL state 1555.

Operation of the sensor of the present invention is fundamentally the recognition of edges and tracking those changes over time. As noted previously, an edge is defined as a difference of intensities between two adjacent black and white pixels. For the present invention, the difference of intensities is typically (though not necessarily) sensed as a difference in currents. With the optics and ball of the exemplary embodiment, the ratio between the currents corresponding to black and white spots is typically between 3 and 4 or at least larger than 2 in both the x and y directions, although smaller differences may also be acceptable in some embodiments. For purposes of discussion of this embodiment, an edge will be defined as laying between two photodetectors if the ratio of intensities of the two adjacent photodetectors is larger than two. By use of a differential approach, as mentioned briefly above as an alternative to the embodiment shown in FIG. 3, the edges can be detected independently of the absolute light intensity. In addition, differential sensing is less sensitive to gradients due either to lighting conditions or the curvature of the ball, as long as the fall-off in intensity for a ball surface of uniform color does not result in a ratio greater than two between two pixels.

Figure 17A:
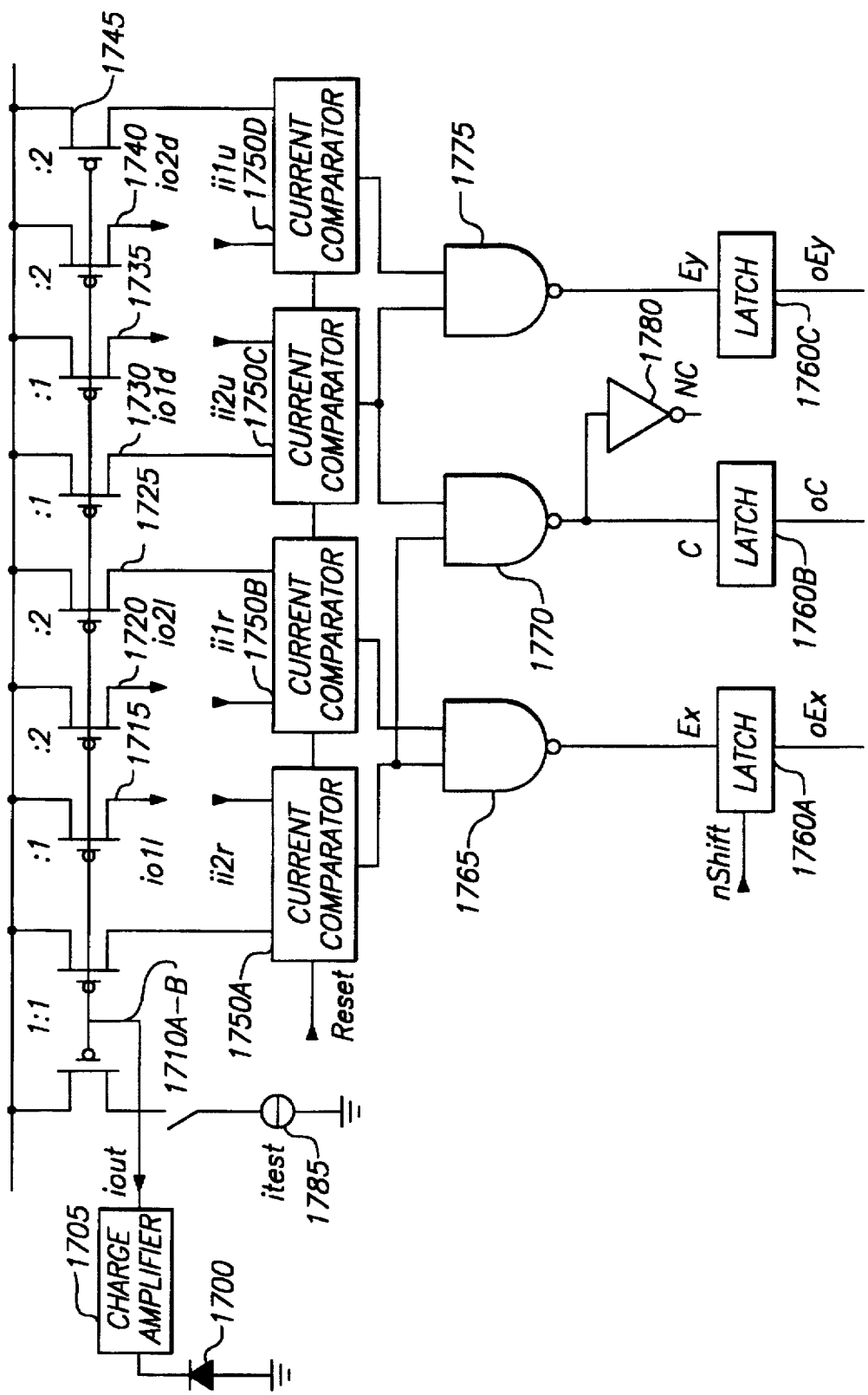
FIG. 17A illustrates in schematic form the logic associated with each type P pixel in FIG. 16.

The differential sensor shown in FIG. 17A is one approach to detecting the edges of the moving ball, and can be taken in conjunction with FIG. 17B, which shows a plurality of pixels P and two successive images $I_t$ and $I_{t-1}$ at times t and t−1 where black and white pixels represent low or high reflected light levels, respectively, while hashed pixels represent pixels detecting an intensity change. A photodiode 1700 receives light input reflected off the ball, and provides accumulates charge in proportion to the light reaching it while the LEDs 730 (FIG. 7A), which are typically pulsed, are on. The current is supplied to an amplifier 1705. The amplifier 1705 amplifies the current enough to output a current $I_{out}$ sufficient to allow a comparison with the adjacent right and top pixels in a predetermined time period, such as 50 μs. Each pixel also sends its current to its bottom and left neighbors, as explained previously in connection with FIG. 4 and shown in FIG. 17 as 1710A–B, 1715, 1720, 1725, 1730, 1735, 1740, and 1745. The outputs of the various differential stages 1710 1745 can then compared in current comparators 1750A–1750D, and the results of those comparisons can be latched into latches 1760A–1760C, after conditioning through combinational logic 1765–1775 and activation of the latch operating signal nshift. Comparisons can then be performed while the LED is off, where the latches store data representing values for edges on the X axis (Ex), edges on the Y axis (E$_y$), and color of the pixel (C and its complement NC), but as they existed during the previous state. The stored data from the previous state may be represented as oE$_x$, oE$_y$, and oC.

For the exemplary embodiment shown herein, various assumptions have been made about the signal currents. First, to accurately detect edges, it has been assumed above that the ratio of currents corresponding to a black spot and a white spot are assumed to be at least two; thus, a value of two has been arbitrarily chosen for the current comparator, although a lower or higher value would also work. Second, it has been assumed for the exemplary embodiment that the mismatch between two adjacent photodiodes is less than twenty percent although it has been shown that the circuit works acceptably at least as low as a ratio of 1.7:1.

An edge is detected is the current in the sampled pixel is either twice or half the current in the neighboring pixel. In addition, color of the pixel is determined as high, or white, if the current in the pixel is either twice the current in the adjacent right cell or twice the current in the adjacent top cell. It will be apparent to those skilled in the art, from the teachings herein, that such a paradigm detects color in a sampled pixel only when an edge exists at its right or at its top, and tests only for white pixel. It is believed apparent that the invention includes extending detection to comparisons with other selected pixels and testing for black spots, and detailed discussion of such addition features is not believed necessary in this disclosure.

The pixel circuitry depicted in FIG. 17 also offers the additional feature of having test circuitry integrated into the sensor. A test current source $I_{test}$ indicated at 1785 has been provided to supply a reference signal in parallel with the charge amplifier 1705. This permits injection of an image through the circuitry at the wafer test level, which reduces the amount of time required to test each wafer. In addition, as noted previously, a scanning scheme allows comparisons between the value of the analog output current of the charge amplifier with a programmable reference current. The reference current $I_{ref}$, as noted previously, can be set by a four bit digital word supplied to control hysteresis. For the particular embodiment shown, if all four bits of the hysteresis word are zero, $I_{ref}$ will be zero; but if all four bits are ones, $I_{ref}$ will be about 500 nA, which is substantially representative of the current amplifier in response to a pulse of white light for a suitable period.

Referring next to FIG. 18, the biodirectional pad of the present invention may be better appreciated. A DATA OUT signal, on line 1900, is combined with a DIR signal on line 1905 in a NOR gate 1910. The output of the NOR gate 1910 supplies a non-inverting gate to a transistor 1915 and an inverting gate to a transistor 1920. Connecting between the respective source and drain of the transistors 1915 and 1920 is a pull down resistor 1925, which may for example be on the order of 10–20 KΩ. A diode 1930 is shunted across the source and drain of the transistor 1915, the drain of which is tied to ground. The output of the transistor/pullup resistor stage is taken at the junction 1935 of the drain of the transistor 1920 and one end of the resistor 1925. A second diode 1940A is connected between ground and the junction 1935 and 1940 while a third diode 1940B is connected between the voltage supply and the junction 1935. A pair of splitter resistors 1945A-B are series connected between the output pad 1950 of the sensor and the junction 1935. A pair of diodes 1955A-B and commonly connected to the junction between the pad 1950 and the resistor 1945B, with the other terminals of the diodes connected to ground and the voltage supply, respectively. Finally, a data input from the pad 1950 (or external to the sensor) to the remainder of the interface logic 1355 is taken at the junction of the two resistors 1945A-B, through two buffer inverters 1960.

The arrangement shown in FIG. 18, while facilitating biodirectional communication between the sensor of the present invention and the external world, is particularly important because it allows reduction in pin count. In the exemplary embodiment described herein, particularly as shown in FIG. 7A, the sensor can be seen to have only four pins, which facilitates mounting and relating issues.

To achieve the goal of bi-directionality, the pull down resistor 1925 is switch between input and output states at appropriate times. The pad 1410 (FIG. 14) is controlled so that the pull down resistor 1925 is connected when the pad is in input mode—which occurs when the signal DIR on line 1905 is low. However, the resistor 1925 is disconnected when the pad is in the output mode, caused by the signal DIR being high. It will be apparent to those skilled in the art that, if the data output signal on line 1915 is to be high, the state of the signal DIR is important. However, if the signal on line 1915 is to be low, the state of the DIR signal is irrelevant. It will be appreciated by those skilled in the art that the delay associated with pad capacitance must be taken into account to achieve acceptable response times; for the exemplary embodiment described herein, the capacitance associated with the pad is about 20 pf.

Figure 19A:
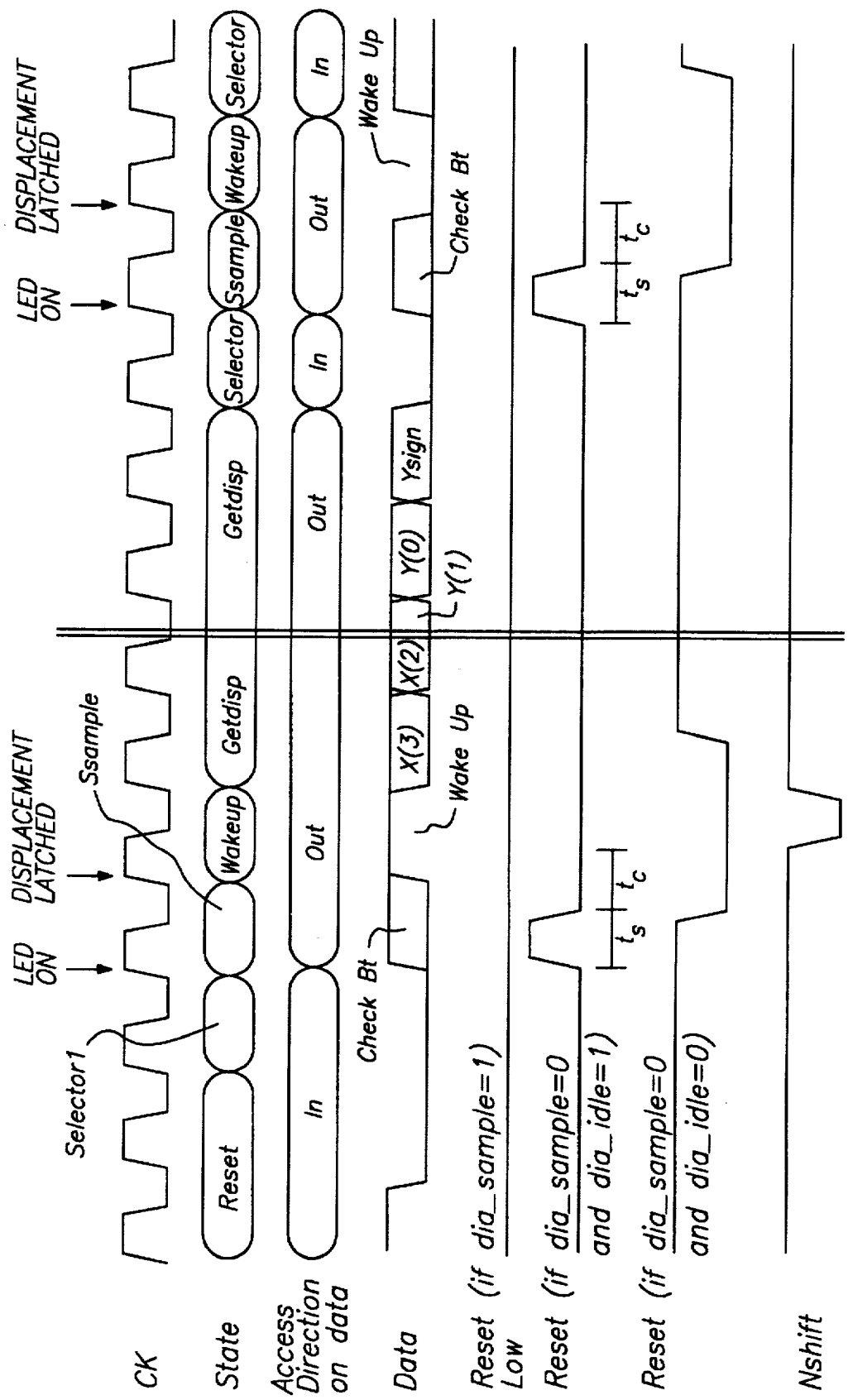
FIGS. 19A and 19B show timing diagrams for the embodiment of FIG. 15 during various phases of operation.
Figure 19B:
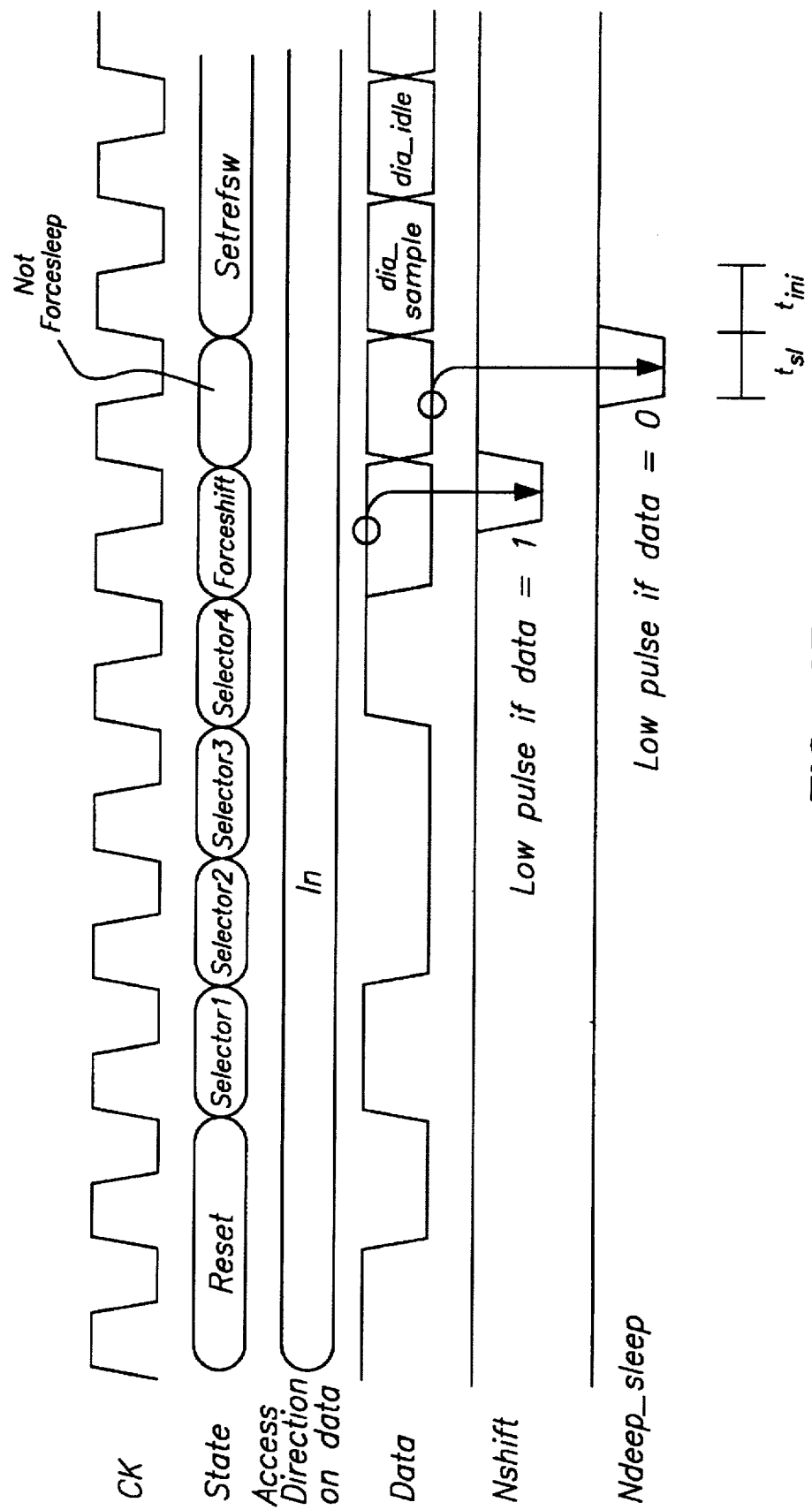
Figure 20A:
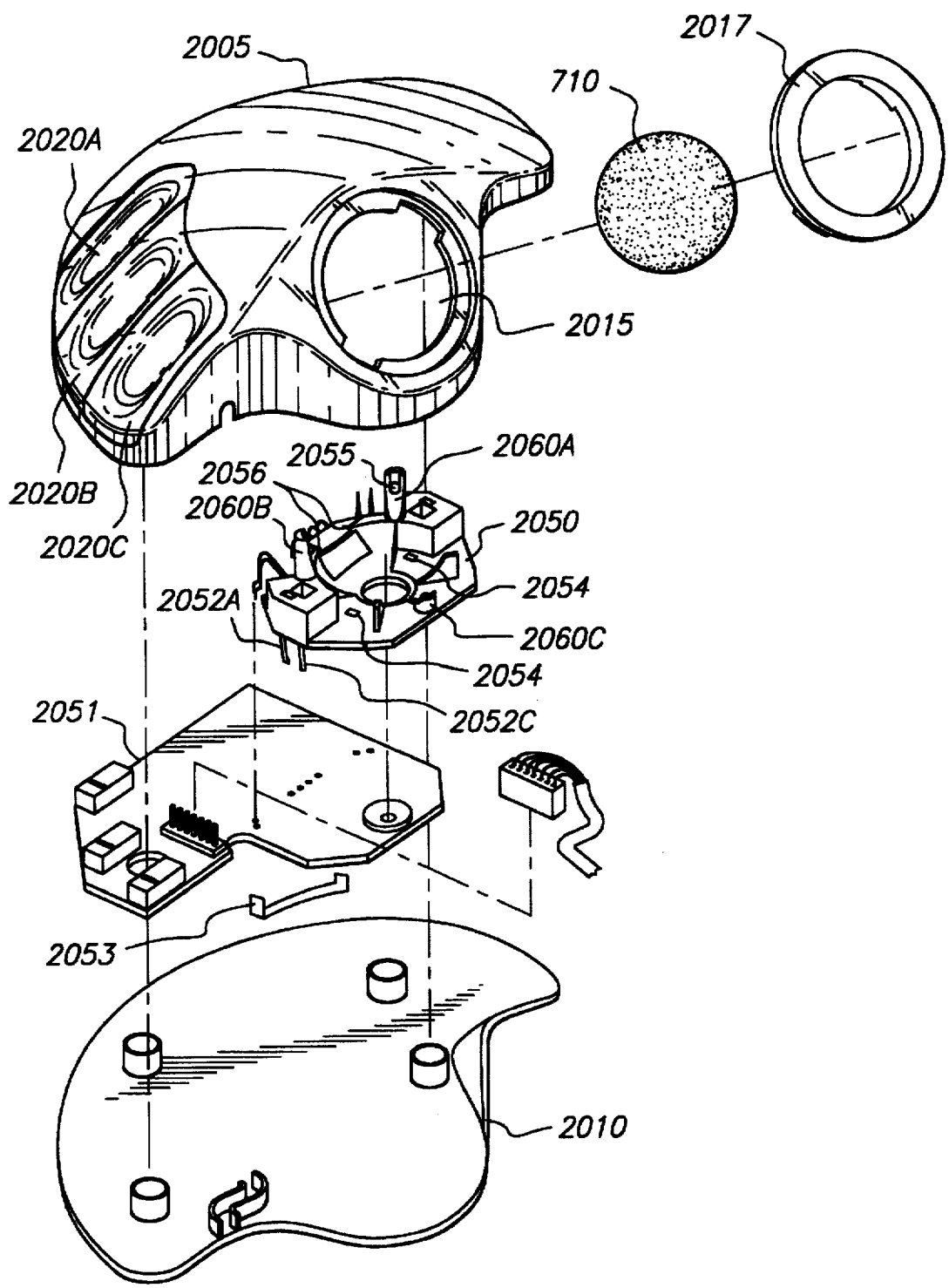
FIG. 20A shows in exploded perspective view a third embodiment of the present invention.
Figure 20B:
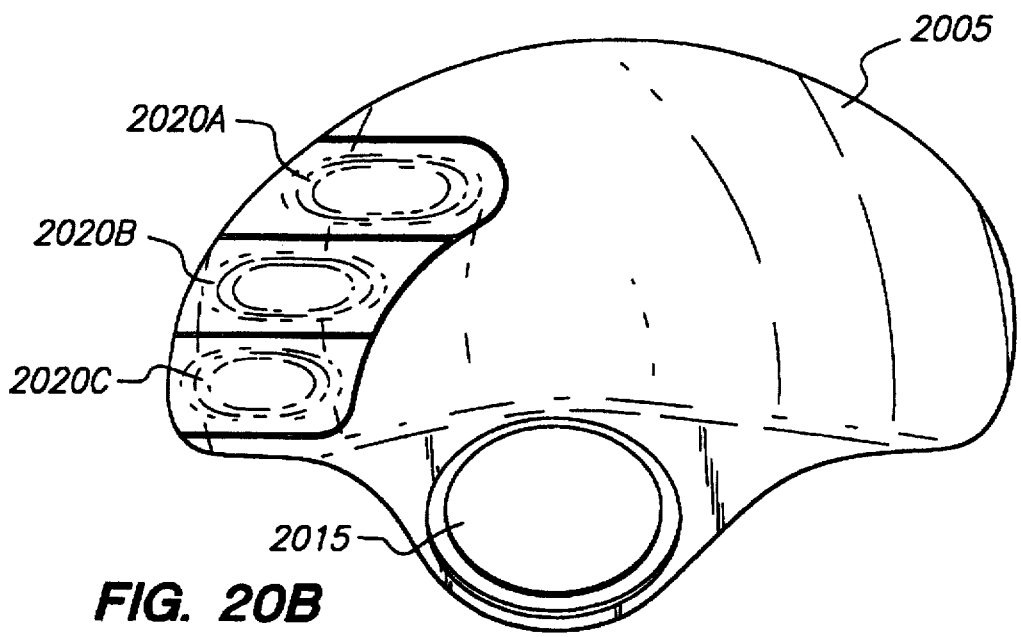
FIG. 20B shows in top plan view the third embodiment of the present invention.
Figure 20E:
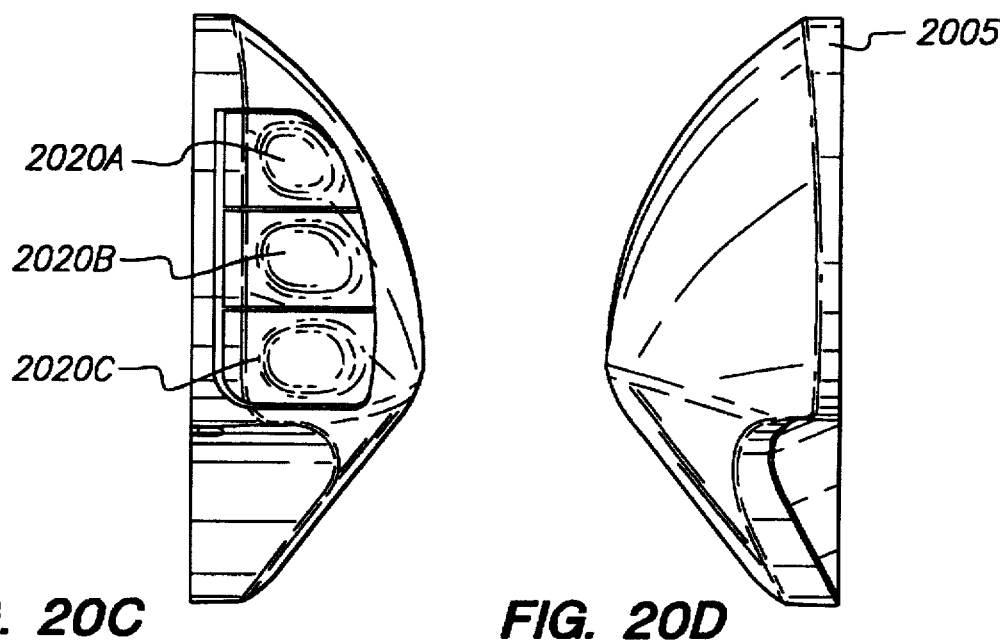
FIG. 20E shows the third embodiment in side elevational view.
Figure 20E:
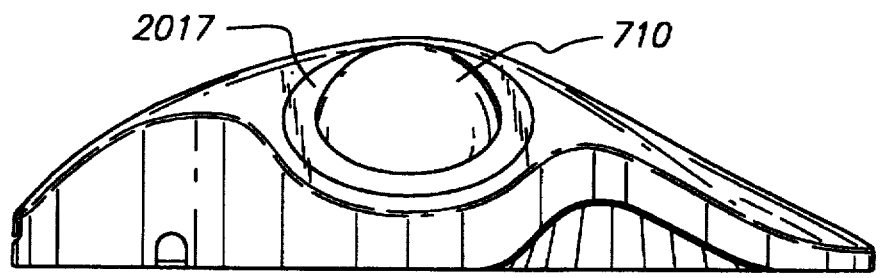

Shown in FIGS. 19A and 19B are timing diagrams for various operational states of the system. FIG. 19A describes the main loop that is used to read displacements, while FIG. 19B describes the latching of a new image, as well as the imposition of sleep mode.

Referring next to FIGS. 20A–E, a third embodiment of the present invention may be better appreciated. The FIGS. 20A–E show the trackball in exploded perspective, top plan, front elevational, rear elevational and side elevational views, respectively, with like elements for the embodiment of FIG. 7A et seq. having like reference numerals. This embodiment, which is also a trackball but is implemented as an external device rather than integrated into the remainder of a system such as laptop computer or other control device, includes an upper housing 2005 and a lower housing 2010, best appreciated from the exploded perspective view of FIG. 20A. The upper housing 2005 includes an angled aperture 2015 through which a ball such as the ball 710 may be inserted. A retaining ring 2017 may be provided to allow easy insertion and removal of the ball. A plurality of buttons or switches 2020A–C may be provided for entering commands of pointing devices.

Enclosed within the housings 2005 and 2010 is a ball cage 2050, as shown in FIGS. 21A–D, which supports the ball 710. The ball cage is affixed to a printed circuit board 2051 by means of a pair of clips 2052A–B in combination with a pair of positioning pins 2052C–D, all of which extend through associated slots or holes in the printed circuit board 2051. The lens 745 is held in position by a metallic clip 2053 which extends from the underside of the PC board 2051, through a pair of slots therein, and clips into position on a pair of ears 2054 on the ball cage. The ball rests on three bearings 2055, each of which is maintained within one of three posts 2060A, 2060B and 2060C. Unlike similar supports known in the art in which the bearing typically are located in a horizontal plane, the post 2060C is shorter than the posts 2060A and 2060B so that the bearings define a plane sloped at an angle of approximately 30 degrees. This angled support cooperates with the upper housing 2005 to cause the ball to extend through the angled aperture 2015, which allows an improved, ergonomic positioning of the thumb relative to the remainder of the hand, such that the fingers and thumb of the hand are in a substantially neutral posture while operating the trackball. In addition, a pair of arcuate supports 2065 may be provided to increase the rigidity of the baseplate, and may provide some absorption of force in the event the device is dropped. An aperture 2070 is provided through which the ball may be illuminated and viewed by the same optics and same electronics as is used with the embodiment of FIG. 7A. The sensor 735 is held in place by a further pair of clips 2056 which are typically formed as part of the ball cage 2050.

Figure 21A:
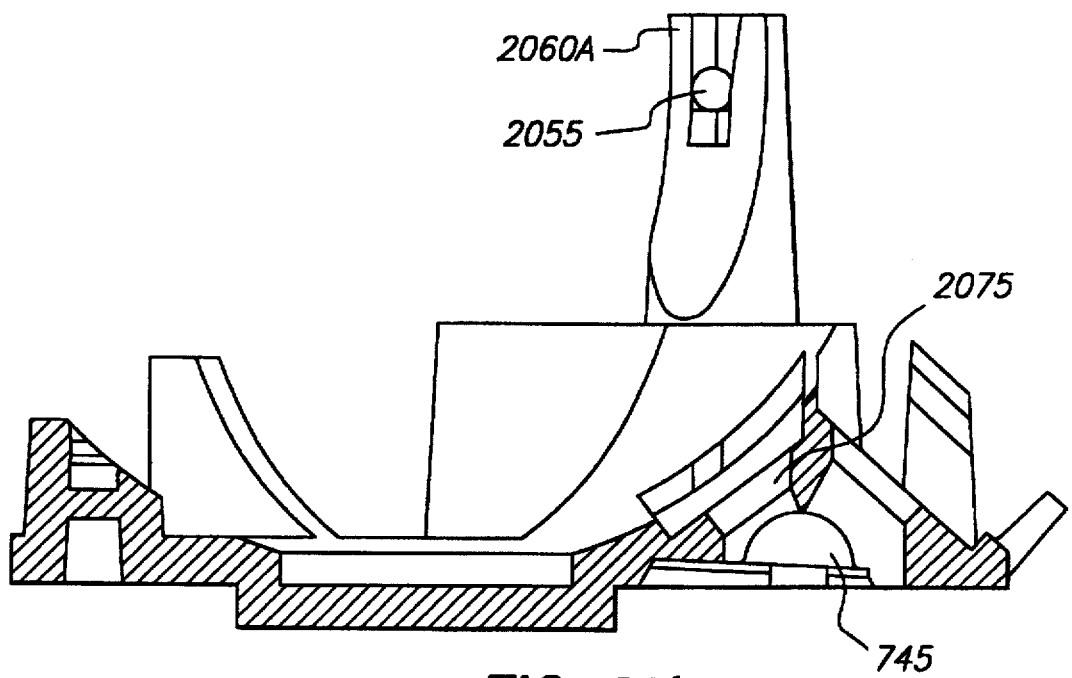
FIG. 21A shows in three-quarter perspective view the ball cage of the third embodiment.
Figure 21B:
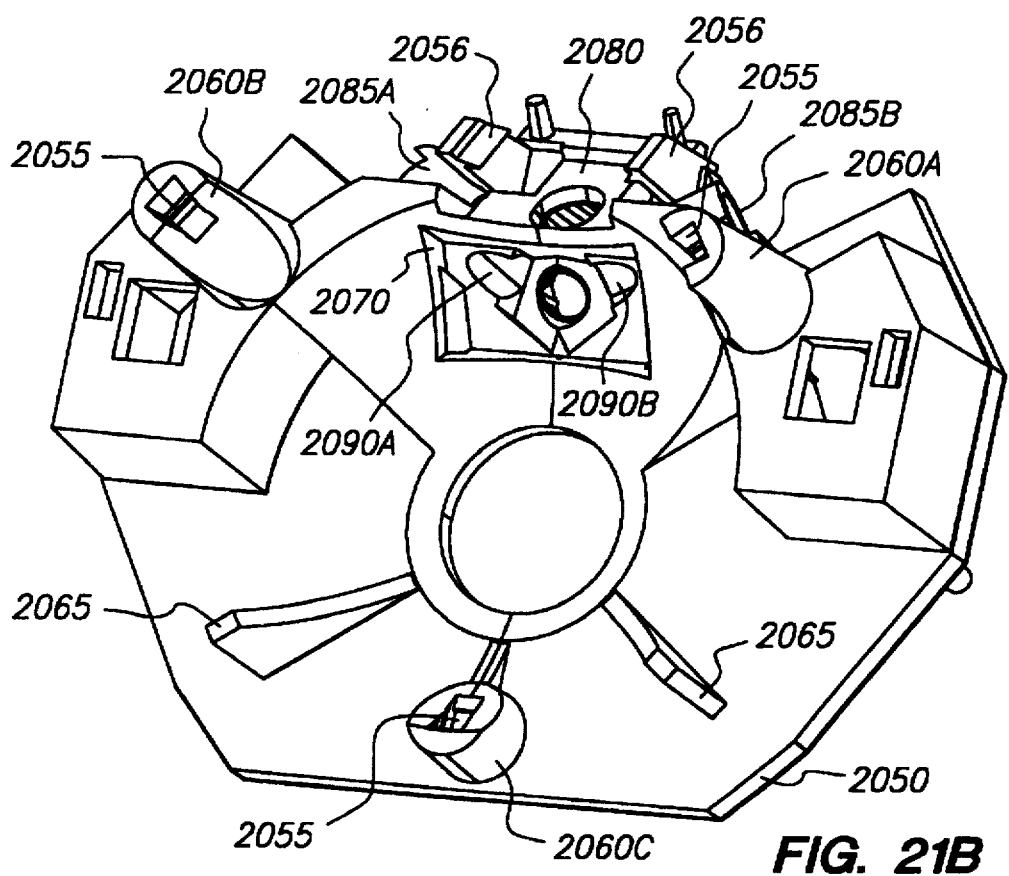
FIG. 21B shows in cross-sectional side view the ball cage and optical elements of the third embodiment.
Figure 21C:
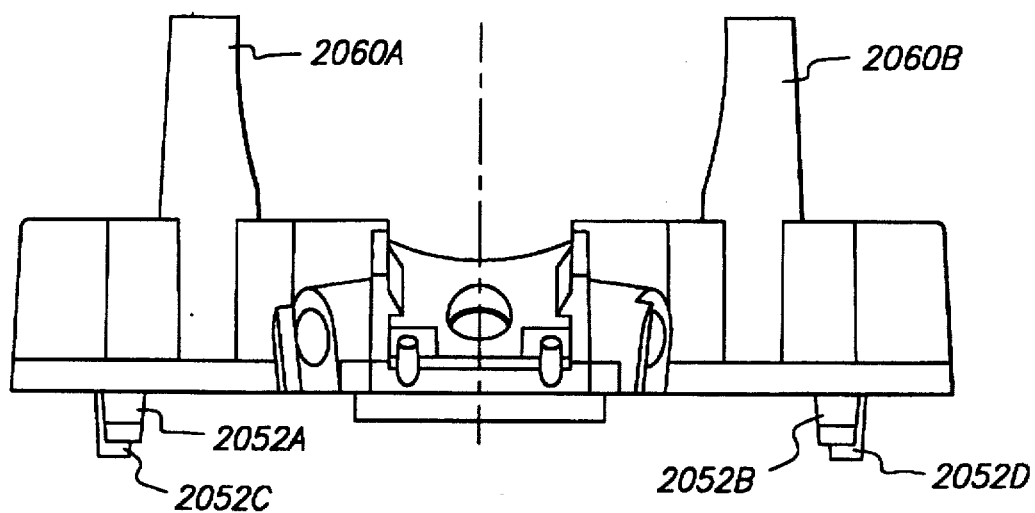
FIG. 21C shows the ball cage in rear elevational view.
Figure 21D:
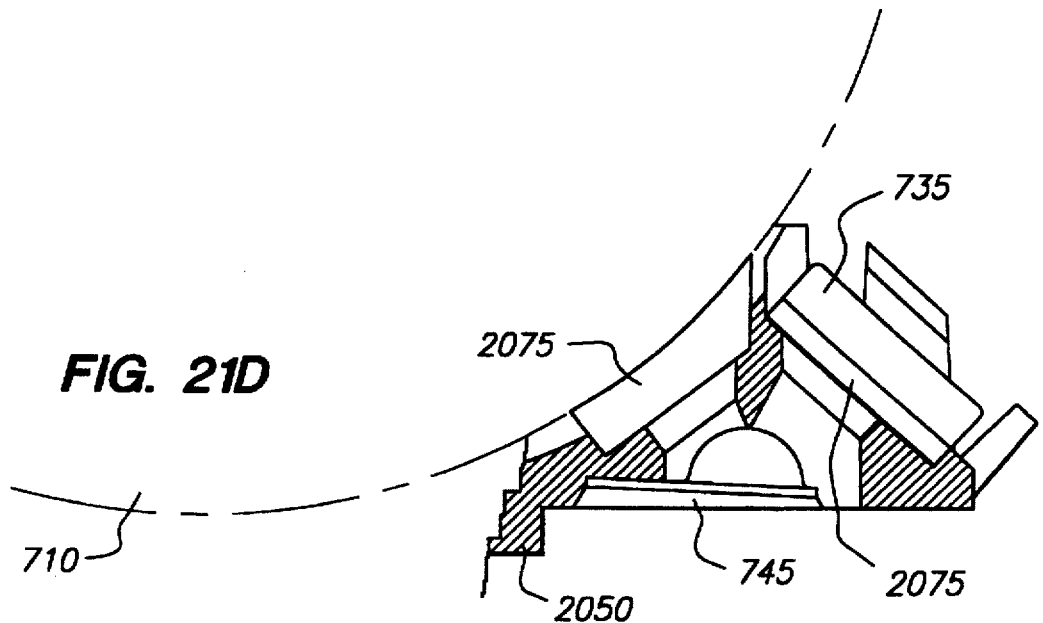
FIG. 21D shows a portion of the ball cage in relation to a ball.

With particular reference to FIGS. 21C and 21D, the operation of the optics may be better appreciated. FIG. 21C shows the ball cage 2050 in rear elevational view, while FIG. 21D shows a portion of the ball cage 2050 in relation to a ball such as the ball 710. A window 2075 is provided in the optical path between the ball 710 and the sensor 735, with the lens 745 providing a folded light path as in the third embodiment. Referring again to FIG. 21B, the location for the sensor 735 is provided by a mounting boss 2080, while a pair of cylindrical ports 2085A–B are provided into which a pair of LEDs such as the LEDs 730 of FIG. 7A may be inserted to illuminate the ball 710 through ports 2090A and 2090B.

Figure 22:
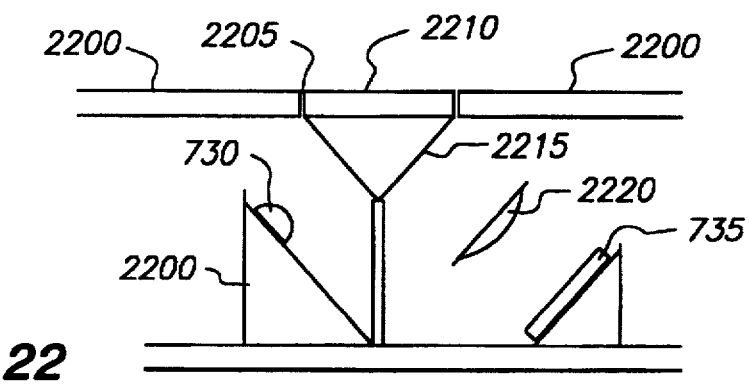
FIG. 22 shows in cross-sectional side view a fourth embodiment of the invention not requiring a ball.

Referring next to FIG. 22, a further embodiment of the present invention may be appreciated. The embodiment of FIG. 22 is particularly of interest because it does not use a speckled ball or other speckled pattern, but at the same time works on the same principles as the remaining embodiments disclosed herein. In particular, a housing 2200 includes an orifice 2205 into which a window 2210 may be placed, although the window is neither necessary nor preferred in all embodiments. A prism 2215 is also supported within the housing 2200 at a position which is optically aligned with the window 2210. In an exemplary embodiment the prism 2215 is a right angle prism positioned with its hypotenuse face placed parallel to (or as a replacement for) the window 2210. One or more LEDs are positioned in line with one of the right angle faces to cause total internal reflection of the light emitted by the LEDs off the inside of hypotenuse face of the prism 2215, in the absence of interference. Optically aligned with the LEDs, but on the side of the other right angle face of the prism 2215, is a lens 2220, which may be a biconvex lens. The prism may be of any suitable angle which provides for total internal reflection; i.e., the incidence angle of the light is greater than arcsin(1/n), where "n" is the refractive index of the prism material. In the exemplary embodiment, where the prism may be made of PMMA, this angle is about forty-two degrees from perpendicular. The window 2210 may be provided to serve as a filter for visible light, and also to provide a more scratch resistant surface than the prism 2215; in at least some embodiments it is useful to affix the window directly to the prism.

Positioned on the opposite side of the lens 2220 from the prism 2215 and optically aligned with it is a sensor such as the sensor 735. During operation, a finger (not shown) may be placed on the window 2210 and moved thereover. In the absence of a finger, light from the LED enters the prism and strikes the top surface of the prism at an angle greater than 42 degrees from perpendicular, thus causing total internal reflection. When a finger is present, the ridges of the fingerprint contact the glass, canceling the total reflection in the contact areas. By properly adjusting the focal length of the lens 2220 and the optical path length from the window 2210 to the sensor 735, an image of the finger's ridges and whorls—i.e., the fingerprint—may be formed on the sensor 735. In this manner the movement of the light and dark spaces of the fingerprint over the window 2210 yields the same edge movement over the pixels of the sensor 735 as occurs with the movement of the ball 710, allowing cursor movement to be controlled merely by the movement of a finger. It will be appreciated by those skilled in the art that the linear optical path of FIG. 22 may be made more compact by providing a more complicated prism which folds the light path. In at least some such embodiments, a lens may be formed integrally with the prism to focus the image on the sensor, and one of the right angle surfaces of the prism itself may provide the window against which the finger may be placed. In other embodiments, the lens may be eliminated simply by placing the finger against the hypotenuse of a right angle prism, which permits a light source on one of the right angle sides to illuminate the finger, with the reflected light illuminating a sensor of the type described above. In each of these embodiments the resulting image on the sensor is the result of frustrated total internal reflection, wherein the presence of the light and dark spots of the illuminated finger prevent total reflection of the illuminating light.

In addition to providing an elegantly simple solution for cursor control, detection of the fingerprint ridges also providing a method of detecting switch activity. By increasing finger pressure on the window or prism, the percentage of dark areas increase. A thresholding circuit may be provided such that, by an increase in dark areas in excess of the threshold, a "switch" activity may be detected. It will also be appreciated that the embodiment of FIG. 22 provides an effective, efficient device for identifying fingerprints, when combined with suitable electronics for storing and comparing appropriate images. Those skilled in the art, given the teachings herein, will recognize that numerous other alternatives also exist.

It is also possible to create an optical mouse which does not require a ball by using a similar imaging technique. A pattern, such as that on a table or other suitable printed figure having sufficient numbers of dark and light areas of sufficient size, can be detected in much the same manner as a fingerprint, although the particular components of the device are somewhat different. With reference to FIG. 23A-B, an optical mouse is shown which uses the same principles as discussed in connection with the second and third embodiments discussed previously. The upper housing and most of the lower housing have been removed for clarity from the device shown in FIG. 23, although appropriate housings are generally well known in the art; see, for example, FIG. 2 of U.S. patent application Ser. No. 672,090, filed Mar. 19 1991, now abandoned, and assigned to the assignee of the present application, the relevant portions of which are incorporated by reference. As before, like components are given like numerals. In particular, an optical assembly 2290 includes an optical housing 2300 having a pair or angular bores 2310A-B each of which receives, respectively, one of the LEDs 730. An upper central bore 2320 extends from the top of the optical housing 2300 and part way therethrough until it communicates with a lower central bore 2330. The lower central bore extends through the bottom of the optical housing 2300, but is smaller in diameter than the upper central bore 2320 so that the lower central bore fits between the angular bores 2310A-B, and is typically spaced symmetrically therebetween. The purpose of the central bore 2360 is to provide a shutter, and also to prevent stray light from reaching the sensor. A plate or window 2340 is affixed by any suitable means to the bottom of the housing 2300. The plate 2340 is transparent to the frequency of light emitted by the LEDs 730, and may be made of any suitably transparent material which is also scratch resistant such as plastic or glass.

The lens 745 is positioned within the upper central bore 2320, which is typically sized to center the lens 745 above the lower central bore 2330. An aperture plate 2350, typically of substantially the same outer diameter as the upper central bore 2320, fits into the upper central bore 2320 to fixedly position the lens 745. The aperture plate 2350 further includes a central bore 2360 which communicates light passing through the lens 745 to the sensor 735, positioned above the aperture plate 2350. The central bore 2360 may also be conical, with the narrower portion at the bottom. A retaining ring 2370, which fastens to the top of the optical housing 2300 by any suitable means, such as clips or screws, maintains the relative positions of the sensor 735, aperture plate 2350 and lens 745.

The assembly 2290 is positioned within the upper and lower housings of a mouse so that the plate or window 2340 is positioned above a speckled pattern of the same criteria as that on the ball 710, although in this instance the pattern is provided on a pad, tabletop, or other suitable, substantially flat surface. A portion of a suitable lower housing is shown at 2380. As the mouse is moved over the pattern, the light from the LEDs 730 is directed through the plate 2340 onto the pattern, and in turn is directed through the plate 2340, up through the lower central bore 2330 and through the lens 745. The lens then images the pattern on the sensor 735 in the same manner as discussed previously, so that movement may be readily detected by the changes in position of the edges in the pattern. While the exemplary embodiment has two LEDs, in at least some embodiments only a single LED is required.

While the foregoing design provides a simple and elegant design for a mouse capable of detecting motion, it typically requires a pattern having speckles meeting the criteria previously discussed. However, by altering the optical components to resolve small pattern elements, it is also possible to provide a pointing device which can detect movement over an object such as everyday paper, where the weave of the paper provides the detected pattern.

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

We claim:

1. A cursor pointing device for controlling the position of a cursor on a display comprising:

a ball having thereon a fixed irregular pattern of areas which appear light and dark when illuminated by substantially monochromatic radiation;

source means for illuminating a portion of said ball with said substantially monochromatic radiation;

sensor means responsive to said substantially monochromatic radiation reflected from the ball and impinging on the sensor for creating an output; and processing means responsive to the output from the sensor means for generating a cursor control output.

2. The pointing device of claim 1 wherein said substantially monochromatic radiation is infrared.

3. The pointing device of claim 1 wherein the pattern is covered by a layer which is transparent to radiation of the predetermined frequency.

4. The pointing device of claim 1 further comprising:

optical means interposed between the ball and the sensor means for focusing an image of an illuminated portion of the ball on the sensor means.

5. The pointing device of claim 4 further comprising:

aperture means for limiting the optical means.

6. The pointing device of claim 3 wherein said layer is opaque to visible light.

7. The pointing device of claim 1 wherein the sensor means includes a plurality of pixels, each capable of generating an output signal related to the amount of light reaching that pixel, and wherein the processing means intermittently samples the output signals of the pixels in accordance with a predetermined sequence.

8. The pointing device of claim 7 wherein the source means intermittently illuminates the ball in accordance with the predetermined sampling sequence.

9. The pointing device of claim 1 wherein the cursor pointing device is a trackball.

10. The pointing device of claim 1 wherein the radiation reflecting off the ball diffusely illuminates the sensor means.

11. The pointing device of claim 1 wherein the sensor means comprises a photosensitive array having a plurality of pixels.

12. The pointing device of claim 11 wherein the pixels of the photosensitive array provide outputs to the processing means which permit the correlation of edges in the pattern and temporal intensity changes in the illumination of the ball.

13. The pointing device of claim 1, wherein said substantially monochromatic radiation is not coherent radiation.

14. The pointing device of claim 1, wherein said sensor means comprises:

a plurality of pixels, responsive to said radiation reflected from said ball, each of said pixels includes:

a photodetector element for receiving said radiation reflected from said ball and for converting said radiation into an electrical signal having an signal strength corresponding to an intensity of said received radiation;

a first memory unit for storing a first intensity value of said pixel representing the intensity of radiation received by said photodetector element at a first time;

a second memory unit for storing a second intensity value of said pixel representing the intensity of radiation received by said photodetector element at a second time;

a first comparator, disposed to receive signals from said first memory unit, for comparing said first and second intensity values to identify if an edge condition occurred between said first time and said second time.

15. The pointing device of claim 14 wherein said first comparator determines that an edge condition occurred if a ratio of said first intensity value and said second intensity value is not within a predefined range.

16. The pointing device of claim 15, wherein each of said pixels further comprises:

a second comparator, disposed to receive an adjacent pixel signal from an adjacent pixel of said plurality of pixels representing an intensity of radiation received by said adjacent pixel, for comparing a signal representing one of said first and second intensity values with said adjacent pixel signal to identify an edge condition.

17. The pointing device of claim 16 wherein said second comparator determines that an edge condition exist if a ratio of said first intensity value and said second intensity value is not within a predetermined range.

18. A trackball pointing device for controlling the position of a cursor on a display comprising:

a ball, for manipulation by the palm or fingers, having thereon a fixed irregular pattern of areas which appear light and dark when illuminated by substantially monochromatic radiation;

source means for illuminating a portion of the ball with said substantially monochromatic radiation;

sensor means responsive to the radiation reflected from the ball, for receiving said reflected radiation and for creating an output in response to said received radiation, and processing means responsive to the output from the sensor means for generating a cursor control output.

19. The trackball of claim 18 further including a lens means for focusing an image of the ball on the sensor means.

20. The trackball pointing device of claim 18 wherein said pattern is covered by a layer which is transparent to radiation of the predetermined frequency.

21. The trackball pointing device of claim 20 wherein said layer is opaque to visible light.

22. The trackball pointing device of claim 18, wherein said substantially monochromatic radiation is not coherent radiation.

23. The trackball pointing device of claim 18, wherein said sensor means comprises:

a plurality of pixels, responsive to said radiation reflected from said ball, each of said pixels includes:

a photodetector element for receiving said radiation reflected from said ball and for converting said radiation into an electrical signal having an signal strength corresponding to an intensity of said received radiation;

a first memory unit for storing a first intensity value of said pixel representing the intensity of radiation received by said photodetector element at a first time;

a second memory unit for storing a second intensity value of said pixel representing the intensity of radiation received by said photodetector element at a second time;

a first comparator, disposed to receive signals from said first memory unit, for comparing said first and second intensity values to identify if an edge condition occurred between said first time and said second time.

24. The trackball pointing device of claim 23 wherein said first comparator determines that an edge condition occurred if a ratio of said first intensity value and said second intensity value is not within a predefined range.

25. The trackball pointing device of claim 24, wherein each of said pixels further comprises:

a second comparator, disposed to receive an adjacent pixel signal from an adjacent pixel of said plurality of pixels representing an intensity of radiation received by said adjacent pixel, for comparing a signal representing one of said first and second intensity values with said adjacent pixel signal to identify an edge condition.

26. The trackball pointing device of claim 25 wherein said second comparator determines that an edge condition exist if a ratio of said first intensity value and said second intensity value is not within a predefined range.

27. An electronic mouse for controlling the position of a cursor on a display comprising:

a ball having thereon a fixed irregular pattern of areas which appear light and dark when illuminated by substantially monochromatic radiation;

source means for illuminating a portion of the ball with said substantially monochromatic radiation;

sensor means responsive to the radiation reflected from the ball, for receiving said reflected radiation and for creating an output in response to said received radiation, and processing means responsive to the output from the sensor means for generating a cursor control output.

28. The electronic mouse of claim 27 wherein said pattern is covered by a layer which is transparent to radiation of the predetermined frequency.

29. The electronic mouse of claim 28 wherein said layer is opaque to visible light.

30. The trackball pointing device of claim 27, wherein said substantially monochromatic radiation is not coherent radiation.

31. The trackball pointing device of claim 27, wherein said sensor means comprises:

a plurality of pixels, responsive to said radiation reflected from said ball, each of said pixels includes:

a photodetector element for receiving said radiation reflected from said ball and for converting said radiation into an electrical signal having an signal strength corresponding to an intensity of said received radiation;

a first memory unit for storing a first intensity value of said pixel representing the intensity of radiation received by said photodetector element at a first time;

a second memory unit for storing a second intensity value of said pixel representing the intensity of radiation received by said photodetector element at a second time;

a first comparator, disposed to receive signals from said first memory unit, for comparing said first and second intensity values to identify if an edge condition occurred between said first time and said second time.

32. The trackball pointing device of claim 31 wherein said first comparator determines that an edge condition occurred if a ratio of said first intensity value and said second intensity value is not within a predefined range.

33. The trackball pointing device of claim 32, wherein each of said pixels further comprises:

a second comparator, disposed to receive an adjacent pixel signal from an adjacent pixel of said plurality of pixels representing an intensity of radiation received by said adjacent pixel, for comparing a signal representing one of said first and second intensity values with said adjacent pixel signal to identify an edge condition.

34. The trackball pointing device of claim 33 wherein said second comparator determines that an edge condition exist if a ratio of said first intensity value and said second intensity value is not within a predefined range.

* * * * *

UNITED STATES PATENT AND TRADEMARK OFFICE
CERTIFICATE OF CORRECTION

PATENT NO.    : 5,703,356

DATED         : December 30, 1997

INVENTOR(S)   : Marc Bidiville, et al.

It is certified that error appears in the above-identified patent and that said Letters Patent is hereby corrected as shown below:

In claim 30, line 1: delete "trackball pointing device" and replace with --electronic mouse--.

In claim 31, line 1: delete "trackball pointing device" and replace with --electronic mouse--.

In claim 32, line 1: delete "trackball pointing device" and replace with --electronic mouse--.

In claim 33, line 1: delete "trackball pointing device" and replace with --electronic mouse--.

In claim 34, line 1: delete "trackball pointing device" and replace with --electronic mouse--.

Signed and Sealed this

Fifteenth Day of September, 1998

Attest:

BRUCE LEHMAN

*Attesting Officer*    *Commissioner of Patents and Trademarks*